(12) United States Patent
Hair, III et al.

(10) Patent No.: US 11,038,337 B2
(45) Date of Patent: Jun. 15, 2021

(54) SYSTEM AND METHOD FOR BIDIRECTIONAL DATA, POWER TRANSMISSION, ELECTRONIC FAULT ISOLATION AND SYSTEM RECOVERY

(71) Applicant: Tueor Technologies Inc., Clear Lake, TX (US)

(72) Inventors: James M. Hair, III, Cheyenne, WY (US); Daniel L. Greene, Cheyenne, WY (US)

(73) Assignee: Tueor Technologies Inc., Clear Lake, TX (US)

( * ) Notice: Subject to any disclaimer, the term of this patent is extended or adjusted under 35 U.S.C. 154(b) by 63 days.

(21) Appl. No.: 16/408,533

(22) Filed: May 10, 2019

(65) Prior Publication Data

US 2020/0358279 A1 Nov. 12, 2020

(51) Int. Cl.
*H02H 3/00* (2006.01)
*H02H 1/00* (2006.01)
(Continued)

(52) U.S. Cl.
CPC ............ *H02H 3/00* (2013.01); *H02H 1/0007* (2013.01); *H02H 1/0061* (2013.01); *H02J 1/00* (2013.01); *H04B 3/54* (2013.01)

(58) Field of Classification Search
CPC .......... H02J 1/00; H02J 1/06; H02J 13/00009; H02J 13/0001; H02J 13/00032;
(Continued)

(56) References Cited

U.S. PATENT DOCUMENTS 5,049,871 A * 9/1991 Sturgis .................. H04L 12/437
370/224
6,906,618 B2 6/2005 Hair, III et al.
(Continued)

OTHER PUBLICATIONS

Davenport, Kevin, International Search Report for International Patent Application No. PCT/US2020/031561, dated Aug. 14, 2020, European Patent Office.
(Continued)

*Primary Examiner* — Kevin J Comber
(74) *Attorney, Agent, or Firm* — Jackson Walker, LLP

(57) ABSTRACT

A method and system for bidirectional data, power transmission, electrical/electronic fault isolation, and system recovery is shown and described. An exemplary embodiment includes a DC power source, a main power controller ("MPC") with a MPC microprocessor and an MPC power switcher driver and fault switching control circuit, and a plurality of Nodes connected to the DC power source through conductors that allow both power to be supplied and bidirectional data transfer between a data receiver and the plurality of Nodes. The fault switching control circuit can provide for short detection and isolation (or other fault detection and isolation) without the direct involvement of the MPC microcontroller. The combined use of the conductors for power, data transmission, and fault detection and isolation offers significant advantages over the prior art in terms of weight reduction, system modularity, and complexity, as well as system protection and survivability.

29 Claims, 18 Drawing Sheets

(51) Int. Cl.
*H02J 1/00* (2006.01)
*H04B 3/54* (2006.01)

(58) Field of Classification Search
CPC ........ H02J 2310/46; G06F 1/30; H04B 3/548;
H04B 3/54; H02H 1/0007; H02H 1/0061;
H02H 3/00
USPC .......................................................... 361/88
See application file for complete search history.

(56) References Cited

U.S. PATENT DOCUMENTS

| | | |
|---|---|---|
| 7,015,798 B2 | 3/2006 | Hair, III et al. |
| 7,405,652 B2 | 7/2008 | Hair, III et al. |
| 2004/0263321 A1* | 12/2004 | Hair, III ................. H04B 3/548 |
| | | 370/276 |
| 2006/0046766 A1* | 3/2006 | Hair, III .............. H02J 13/0003 |
| | | 455/522 |

OTHER PUBLICATIONS

Davenport, Kevin, Written Opinion for International Patent Application No. PCT/US2020/031561, dated Aug. 14, 2020, European Patent Office.

\* cited by examiner

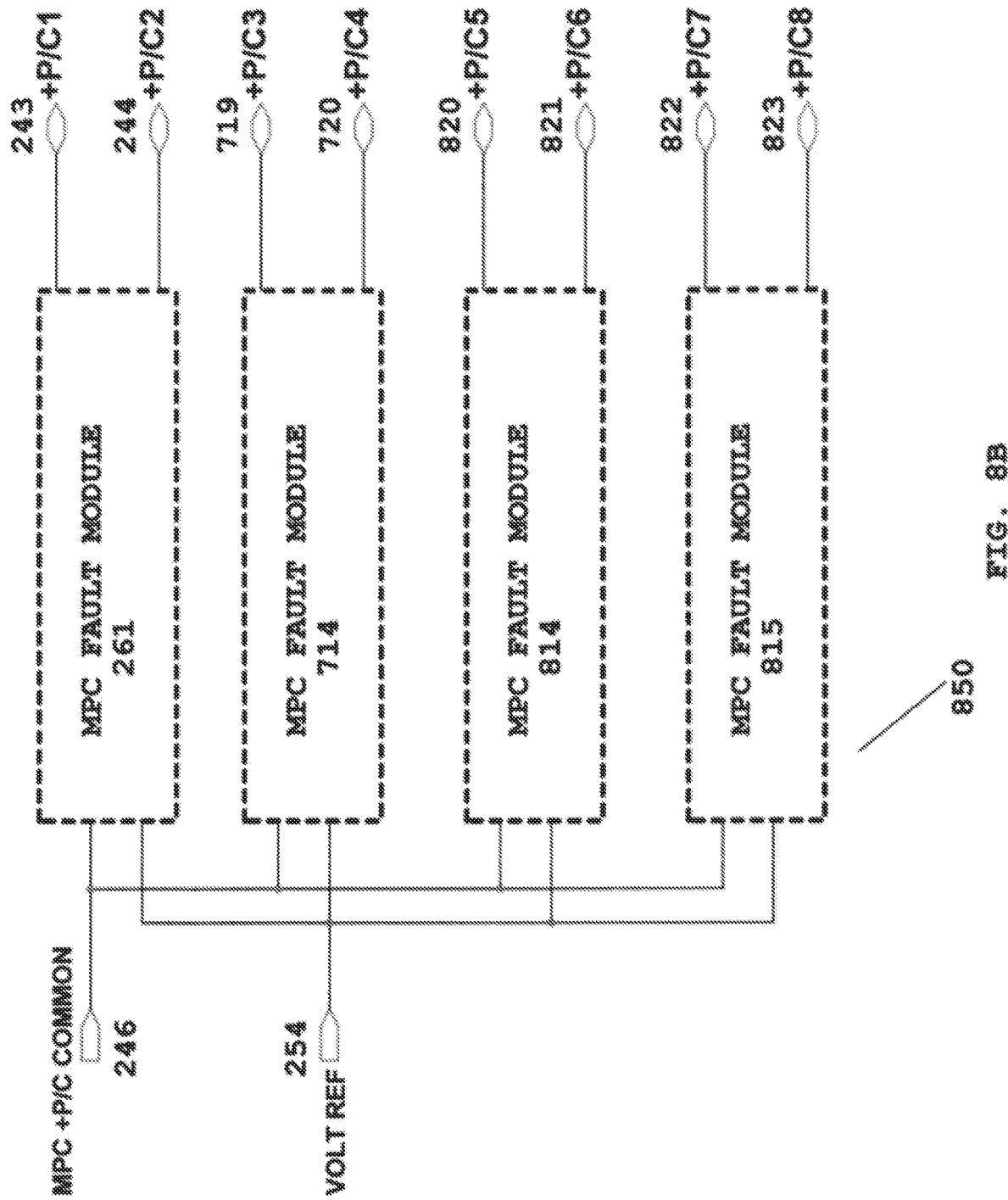

SYSTEM AND METHOD FOR BIDIRECTIONAL DATA, POWER TRANSMISSION, ELECTRONIC FAULT ISOLATION AND SYSTEM RECOVERY

CROSS REFERENCE TO RELATED APPLICATIONS

Not applicable

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

This invention generally relates to methods and systems for distributing electrical power and data throughout an electrical/electronic system utilizing microprocessors and/or microcontrollers, while providing automatic fault, such as shorts, isolation, and protection.

Description of the Related Art

Microcontrollers are found in almost every electronic device that we use in our day-to-day lives. One important application of these has been in the control of electronic devices or circuits. In the past, many critical functions have been accomplished mechanically.

Microcontrollers provide well-known advantages, including making diagnostics and repairs easier in complicated systems. Microcontrollers have also been used to improve the efficiency of machines when used with sensors and actuators in a feedback loop, obtaining more efficient modes of operation. There are, however, some disadvantages to the overuse of microcontrollers.

For an example, look under the hood of a newer automobile to see one disadvantage to microcontroller use: before microcontrollers became small and reliable enough to be installed in automobiles, it was possible to see how separate engine parts were connected, and even to see the road underneath. Nowadays engine parts are covered by wires and cables that run from sensors and actuators, attached to the mechanical parts to microcontrollers used for feedback and control. Extra wires and cables are disadvantageous: every extra wire installed consumes power, provides an additional potential failure point, and adds expense and weight. More wires also make maintenance more difficult and complex.

Unfortunately, it has been largely impossible for wires to be eliminated from most microcontroller system designs. Conventionally, a separate wire has been required for power, ground, and each of a plurality of data transmission circuits between a microcontroller and one or more sensors or actuators attached thereto.

Additionally, such standard circuitry has traditionally been vulnerable to shorts and faults that are usually not readily apparent or easy to repair. Normal circuitry has not yet developed a method or technology to effectively address these two system-compromising complications that may occur in most traditional circuits.

There is, therefore, a need for a method and system that can eliminate extra wiring used in power and data/feedback control systems while providing reliable communications and control and better ensure the functionality of the system itself, while also providing ongoing short and fault protection as well as enhanced system survivability.

BRIEF SUMMARY OF THE INVENTION

A system and method for bidirectional data, power transmission, electrical/electronic fault isolation, and system recovery is shown and described. An exemplary embodiment includes a DC power source, a main power controller ("MPC") with a MPC microprocessor and an MPC power switcher driver and fault switching control circuit, and a plurality of Nodes connected to the DC power source through conductors that allow both power to be supplied and bidirectional data transfer between a data receiver and the plurality of Nodes. The system lowers the DC power amplitude (through a voltage drop) almost instantaneously (in microseconds) on a power line to create a space. The space enables a data communication between a Node and the MPC and/or other Nodes before returning to the normal power on the same line. The high speed lowering of power amplitude avoids switching the DC power between a positive and a negative that would otherwise require full wave diodes and larger capacitors. The fault switching control circuit can provide for short detection and isolation (or other electrical fault detection and isolation) without the direct involvement of the MPC microcontroller. The fault switching control circuit provides at least a first power and communication line and second power and communication line from a single DC power source that can be connected in a loop to a plurality of Nodes so the Nodes can be powered from either power and communication line. If the first power and communication line and/or a Node develops a fault, such as a short, the system can quickly (also in microseconds) and automatically sense the short and switch off power from the first power and communication line to isolate that short while continuing to supply power to the Node with the second power and communication line (and vice versa for a short in the second power and communication line and/or Nodes connected to the power and communication line). If the short is remedied, the system can sense the remedy and automatically switch back on current flow from the first power and communication line to the Nodes. The system can operate in microseconds and automatically with the selection of standard discrete components, independent of a microcontroller and generally faster than a standard microcontroller. The system can even automatically isolate a power and communication line from an electrical fault in the system independent of a fuse or circuit breaker and, after the fault is remedied, automatically recover the power and communication line to produce power. The combined use of the conductors for power, data transmission, and fault detection and isolation offers significant advantages over the prior art in terms of weight reduction, system modularity, and complexity, as well as system protection and survivability.

The present disclosure provides a system and method that provides fault protection of the system power and bidirectional data transmission, through a single set of conductors. In an exemplary embodiment, the present invention uses a high-speed MPC power switching circuit to provide power and send control signals from the MPC to a Node by shifting voltage from Power to Ground in pulses. The Nodes may then respond with responsive signals using an active current sink to system ground. The responsive signals are received by a sensitive current receiver circuit at the MPC and/or the constituent Node. Both the MPC and the Node use microcontrollers for processing the control and data signals sent and received.

The disclosure also provides an MPC power switcher driver that is connected to a DC power source, an MPC microcontroller, and multiple Nodes in a power and bidirectional data transmission system, the MPC power switcher driver comprising: one or more lines for receiving voltage control signals from the MPC microcontroller; and one or more lines for communicating with multiple Nodes via an MPC power and switching circuit and a voltage sensitive data receiver circuit coupled to the MPC microcontroller.

System fault detection and isolation is provided in Nodes via a controlling electronic network that senses the condition of the power line entering the Node itself from other power input points. The Nodes can contain a plurality of input-power P-Channel MOSFETs, which are controlled by either a resident transistor or a resident comparator, which sense the incoming power voltage level. If voltage levels drop (i.e., during a short circuit) the transistor or comparator will cause the corresponding P-Channel MOSFET to turn off (that is, deactivate), thereby isolating the short circuit (and/ or other fault) from the affected line and associated Nodes.

In an exemplary embodiment, the present invention comprises a system that includes a power conductor and power return (ground), a DC power source adapted to supply a DC voltage and current, a MPC controller, and a plurality of Nodes. The power conductor is used to connect the MPC controller to the plurality of Nodes, providing both power and bidirectional data transmission for the plurality of Nodes. In this embodiment, the MPC includes a microcontroller, fault control circuit, and a current receiver circuit with a voltage level sensor. The Nodes can include an active current sink to a system ground, a Node microcontroller, and a load, which may be either a sensor or an actuator.

In low voltage and power applications, it is possible to build a main power controller capable of sending signals from the MPC microcontroller to the Nodes by electrically connecting the MPC microcontroller directly. However, in an embodiment of the present invention, the MPC sends signals to the Nodes using a driver comprising a power switching circuit. The MPC microcontroller can be connected to the driver through switches, buffers, and switch drivers that condition voltage control signals from the MPC microcontroller for supply to the power switching circuit. The power switching circuit is thus capable of dropping the voltage from the positive power source in response to different voltage control signals from the MPC microcontroller, as described in the section entitled DETAILED DESCRIPTION below.

The disclosure provides a power and bidirectional data transmission system with electrical fault isolation, comprising: a DC power source; a main power controller ("MPC") coupled to the DC power source, comprising: an MPC power and communication circuit configured to control power from the DC power source in coordination with data communications and comprising an MPC data receiver circuit; a plurality of power and communication lines comprising at least a first power and communication line for a first power and a second power and communication line for a second power and each configured to conduct the power and conduct bidirectional data transfer with the MPC data receiver circuit; and an MPC fault control circuit coupled to each of the first and second power and communication lines and configured to automatically and temporarily turn off power to a portion of the system coupled to the first power and communication line upon the occurrence of an electrical fault in the system and automatically maintain at least partial operation of the system through the second power and communication line; and at least one node comprising a microcontroller and coupled to each of the at least first and second power and communication lines in a loop configuration comprising the first power and communication line coupled between the MPC fault control circuit and the node, and the second power and communication line coupled between the node and the MPC fault control circuit.

The disclosure also provides a main power controller ("MPC") configured to be coupled between a DC power source and at least one load, comprising: an MPC power and communication circuit configured to control power from the DC power source in coordination with data communications; a plurality of power and communication lines comprising at least a first power and communication line having a first power, and a second power and communication line having a second power, and each configured to conduct the DC power and conduct bidirectional data transfer; and an MPC fault control circuit coupled to each of the first and second power and communication lines and configured to automatically and temporarily turn off power to circuitry coupled to the first power and communication line upon the occurrence of an electrical fault in the system and automatically maintain at least partial operation of the system through the second power and communication line.

The disclosure further provides a node, comprising: a node microcontroller; and a node fault and power circuit configured to be coupled between a load and a main power controller that is coupled to a DC power source through at least a first power and communication line for a first power, and a second power and communication line for a second power, and each power and communication line configured to conduct the power into the node and conduct bidirectional data transfer between the node microcontroller and the main power controller in a loop configuration comprising the first power and communication line coupled between the main power controller and the node, and the second power and communication line coupled between the node and the main power controller, the node fault and power circuit configured to automatically and temporarily turn off power to circuitry coupled to the first power and communication line upon the occurrence of an electrical fault between the node and the main power controller and automatically maintain operation of the node through the second power/communications line The disclosure still further provides a method of protecting a system having a DC power source, a main power controller, and at least one node, comprising: providing DC power from the DC power source to the main power controller; providing a first power to a first power and communication line, and a second power to a second power and communication line from the main power controller to the at least one node in a loop configuration wherein the first and second power and communication lines are both coupled to the main power controller and the at least one node; automatically and temporarily turning off power to a portion of the system coupled to the first power and communication line upon the occurrence of an electrical fault in the system and automatically maintaining at least partial operation of the system through the second power and communication line; and automatically sending data about the electrical fault to the main power controller through the first power and communication line, the second power and communication line, or a combination thereof. The method can further include automatically turning on power to the portion of the system through the first power and communication line after correcting the electrical fault.

BRIEF DESCRIPTION OF THE SEVERAL VIEWS OF THE DRAWINGS

The foregoing and other objects, advantages, and features of the present invention will be apparent from the following detailed description and the accompanying drawings, in which:

FIG. 8B is a schematic diagram of a portion of an MPC multi-module fault control circuit having multiple MPC fault modules and multiple Nodes for the exemplary modular four-wire loop configuration system of FIG. 8A.

DETAILED DESCRIPTION OF THE INVENTION

Figure 1:
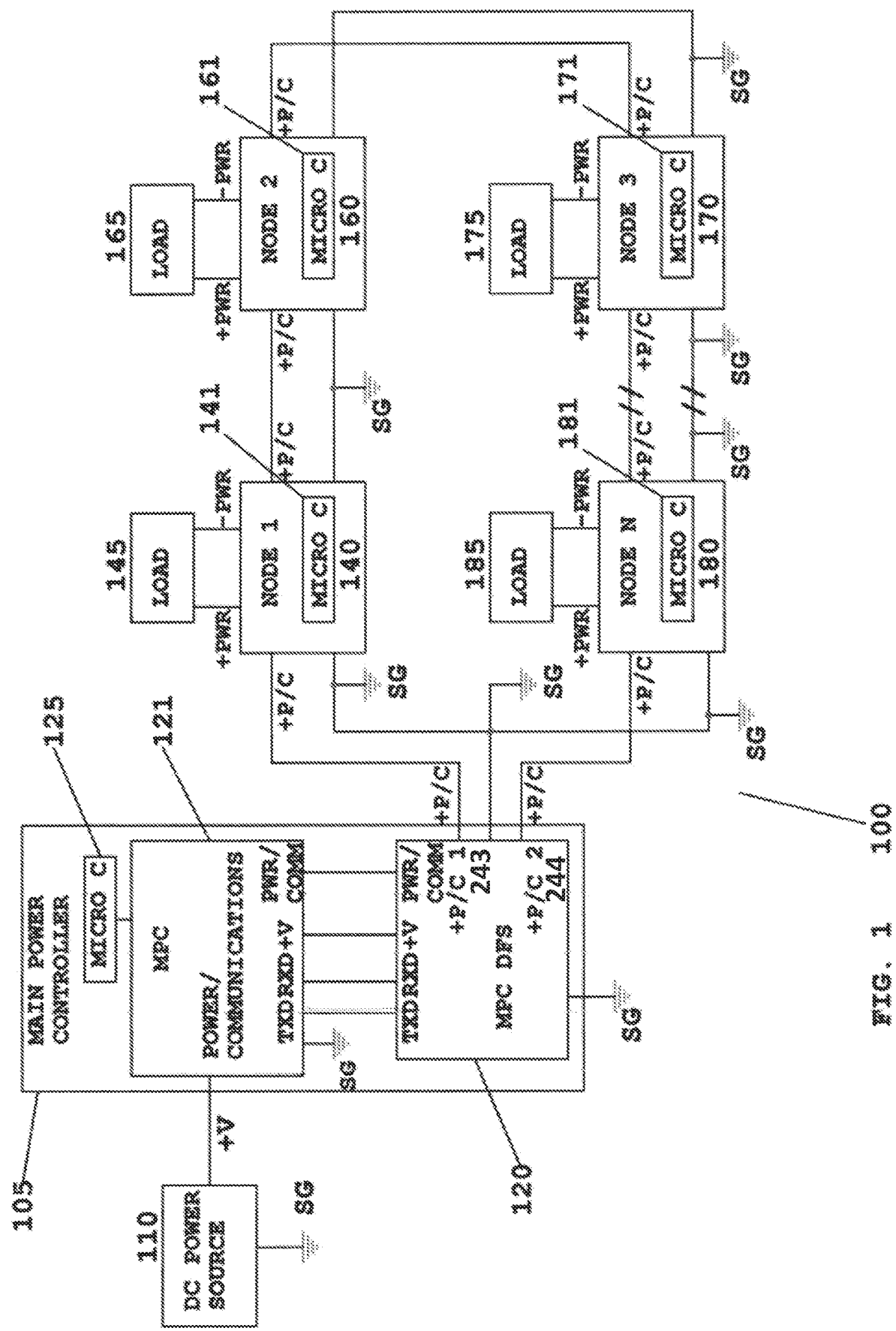
FIG. 1 shows a block diagram of an exemplary embodiment of a power and bidirectional data transmission system with electronic short isolation of the present disclosure.

The Figures described above and the written description of specific structures and functions below are not presented to limit the scope of what Applicant has invented or the scope of the appended claims. Rather, the Figures and written description are provided to teach any person skilled in the art how to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation, location, or with time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the term "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The terms "top", "up", "upward", "bottom", "down", "downwardly", and like directional terms are used to indicate the direction relative to the figures and their illustrated orientation and are not absolute relative to a fixed datum such as the earth in commercial use. The term "inner," "inward," "internal" or like terms refers to a direction facing toward a center portion of an assembly or component, such as longitudinal centerline of the assembly or component, and the term "outer," "outward," "external" or like terms refers to a direction facing away from the center portion of an assembly or component. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unitary fashion. The coupling may occur in any direction, including rotationally. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions. Some elements are nominated by a device name for simplicity and would be understood to include a system of related components that are known to those with ordinary skill in the art and may not be specifically described. Various examples are provided in the description and figures that perform various functions and are non-limiting in shape, size, description, but serve as illustrative structures that can be varied as would be known to one with ordinary skill in the art given the teachings contained herein. As such, the use of the term "exemplary" is the adjective form of the noun "example" and likewise refers to an illustrative structure, and not necessarily a preferred embodiment. Element numbers with suffix letters, such as "A", "B", and so forth, are to designate different elements within a group of like elements having a similar structure or function, and corresponding element numbers without the letters are to generally refer to one or more of the like elements. Any element numbers in the claims that correspond to elements disclosed in the application are illustrative and not exclusive, as several embodiments are disclosed that use various element numbers for like elements.

A system and method for bidirectional data, power transmission, electrical/electronic fault isolation, and system recovery is shown and described. An exemplary embodiment includes a DC power source, a main power controller ("MPC") with a MPC microprocessor and an MPC power switcher driver and fault switching control circuit, and a plurality of Nodes connected to the DC power source through conductors that allow both power to be supplied and bidirectional data transfer between a data receiver and the plurality of Nodes. The system lowers the DC power amplitude (through a voltage drop) almost instantaneously (in microseconds) on a power line to create a space. The space enables a data communication between a Node and the MPC and/or other Nodes before returning to the normal power on the same line. The high speed lowering of power amplitude avoids switching the DC power between a positive and a negative that would otherwise require full wave diodes and larger capacitors. The fault switching control circuit can provide for short detection and isolation (or other electrical fault detection and isolation) without the direct involvement of the MPC microcontroller. The fault switching control circuit provides at least a first power and communication line and second power and communication line from a single DC power source that can be connected in a loop to a plurality of Nodes so the Nodes can be powered from either power and communication line. If the first power and communication line and/or a Node develops a fault, such as a short, the system can quickly (also in microseconds) and automatically sense the short and switch off power from the first power and communication line to isolate that short while continuing to supply power to the Node with the second power and communication line (and vice versa for a short in the second power and communication line and/or Nodes connected to the power and communication line). If the short is remedied, the system can sense the remedy and automatically switch back on current flow from the first power and communication line to the Nodes. The system can operate in microseconds and automatically with the selection of standard discrete components, independent of a microcontroller and generally faster than a standard microcontroller. The system can even automatically isolate a power and communication line from an electrical fault in the system independent of a fuse or circuit breaker and, after the fault is remedied, automatically recover the power and communication line to produce power. The combined use of the conductors for power, data transmission, and fault detection and isolation offers significant advantages over the prior art in terms of weight reduction, system modularity, and complexity, as well as system protection and survivability.

In an exemplary embodiment, power is received at each Node via one or more P-Channel MOSFETs and an RC circuit as a passive filter. In other embodiments, transistor switches or comparators can fulfill the P-Channel MOSFETs' function. The passive filter components are selected to match the sensor or actuator load on the Node, but in some embodiments can be a simple capacitor. Each Node can include a Node microcontroller that, in an embodiment, receives voltage level signals from the MPC. The Node microcontroller can send signals through conductors (and hence, eventually to the MPC) through a digital output connected to an active current sink to system ground. In an exemplary embodiment, the active current resistive source includes a combination of bipolar and field-effect transistors.

The MPC also includes, in an embodiment, a fault control circuit and a current receiver circuit with a voltage level sensor for detecting signals sent from the Node to the MPC. The voltage level sensor can be a low impedance resistor or a hall sensor. The current receiver circuit can include discrete components, integrated circuit comparators, a microcontroller, or a combination thereof. In some embodiments, an analog gate (not shown) controlled by the MPC microcontroller can be used. The fault control circuit and current receiver circuit together are capable of detecting signals from the Node microcontroller and supplying a corresponding digital signal to the MPC microcontroller.

The present invention may be implemented in a variety of environments, including passenger vehicles (such as automobiles, motorcycles, or buses), aircraft (such as commercial or military airplanes, helicopters, or rockets), medical devices (such as heart pacemakers, insulin pumps, infusion pumps, etc.) computers, cell phones, satellites and DC power supplies in buildings (such as homes or offices). The versatility and modularity of the system and method provides an advantage over the prior art, because an installation in a different environment requires few aspects of the system to be redesigned from the prior environment installation.

The present invention also includes a method for supplying power and sending data back and forth between the MPC and a plurality of Nodes. In an exemplary embodiment, power from a DC power source is supplied to constituent Nodes through power lines. Data is sent from the MPC to a plurality of Nodes by switching the level of the DC voltage on the set of power lines, and data is sent from the Node to the MPC by actively sinking current on the set of power conductors by direction and control of the MPC via predetermined instructions. The data is processed using the MPC microcontroller and Node microcontrollers. In an embodiment, the method uses a protocol specially adapted for use with the system.

The present invention generally provides a lighter, lower power, robust, and easy to maintain method and system for transmitting power and bidirectional data between the MPC, acting as a central unit, and the plurality of Nodes, which are connected to either sensor or actuator loads. The present invention requires only two wires for connecting the MPC to the plurality of Nodes, although more than two wires could be used if so desired. Additionally, the use of a system ground allows the use of a single wire to perform a similar function. Both power and data are sent simultaneously through the single or multiple wire conductor. Power is provided as a DC voltage difference.

Power is sent in a first direction through+power/comm 1 line from the MPC to one of the plurality of Nodes by changing the amplitude of the DC voltage in which system voltage and high current provides power to other constituent Nodes within the system. Power from a second direction is supplied through+power/comm 2 line from the MPC to a plurality of the Nodes, which Nodes can advantageously be formed into a redundant loop structure.

Data, generated and provided via the MPC, can be full-voltage and current to provide both power and data to the constituent Nodes. In an advantageous embodiment, the MPC can transmit discrete full power addresses to individually addressed constituent Nodes. The power to the+power/comm 1 line will generally be the same or similar as the power to the +power/comm 2 line under normal operating conditions. During data communications, the voltage is temporarily reduced to the Nodes from the normal power (generally at full voltage) to a lower second power (generally to a lower voltage) to send data through the power/comm 1 line, the second power/comm 2 line, or a combination thereof. The lower second power level creates a data communication space that signals a data communication mode to allow data communication from the nodes before the normal full power is restored.

In an advantageous embodiment, after the MPC sends the aforementioned address data via the system conductor(s), it turns off (deactivates) the high current power and activates a communications-sensing resistor in place of the high current power. This sensing resistor drops the voltage of the system to allow communications throughout the overall node network to include the MPC and all constituent Nodes. The addressed constituent Node will then be capable of sending a packet of data to all constituent Nodes within the defined system, thereby allowing any constituent Node that requires such data to activate a response. The above communications sequence is accomplished via sinking the voltage-to-ground signal from the aforementioned communications resistor for a binary "0", and then releasing the aforementioned communications resistor to "pull up" the voltage to represent a binary "1" within a determined sequence for that particular data packet.

After an addressed Node completes its required transmission of a given data packet, the MPC then, again, replaces the communications-sensing resistor with high-voltage, high-current power for a specified period of time and then transmits the next Node address at full power and, again, places the communications-sensing resistor into the system for the next discreet constituent Node addressee and its subsequent data packet.

As is known to those of skill in the art, sensors include any electronic device capable of generating a signal corresponding to a measurement of a physical state. For example, in a potential iteration of automobile and other vehicle components, sensors might include speed sensors, wheel sensors, thermostats, fuel and oil sensors and voltage sensors, etc. Actuators include any electronic device capable of receiving a signal and changing a physical state in response. In an automotive or other vehicle, actuators include, for example, headlamps, windshield wipers, climate controls, window motors, door locks, speedometers, odometers, or fuel injection controls. In a potential iteration of a generic medical device, sensors might include heart rate, drip rate, sugar levels, event sensors, etc. Actuators could include, for example, defibrillators, pulse output signals, fluid pumps, nerve activation signals, etc. Sensors are used to generate an electronic signal from a physical state; actuators are used to change a physical state using an electronic signal.

FIG. 1 shows a block diagram of an exemplary embodiment of a power and bidirectional data transmission system with electrical fault isolation of the present disclosure. The system 100 includes a DC power source 110, a main power controller ("MPC") 105 having an MPC microcontroller 125, an MPC power and communications circuit ("MPC power/comm circuit") 121, and an MPC power switcher driver and fault switching control circuit ("MPC DFS circuit") 120. The MPC DFS circuit includes a fault control circuit and data receiver circuit, described generally in FIG. 2A with further details in FIGS. 2B-2D. While one MPC 105 is shown, it is understood that the MPC function can be divided in to multiple module, as can other circuits and components described herein. System ground ("SG") line connects the MPC 105, microcontroller 125, and MPC DFS circuit 120. The components are electrically coupled through electrical pathways, herein "conductors" or "lines", such as twisted pair, single wire, body ground, coaxial, traces on a circuit board, and other conductive paths and are usually formed from a pair of conductors or a single conductor and body-ground. The lines include customary connections between components in the circuit or broader system.

Although the DC power source 110 is shown as a battery in the embodiment of FIG. 1, the DC power source 110 can be any suitable DC power source, including, for example, an electrochemical cell, such as a battery or fuel cell, an AC voltage supply, transformer, and rectifier to DC power, or other power sources. In an embodiment of the present invention in which the system 100 is installed in a passenger vehicle, such as an automobile, motorcycle, truck, bus, etc., the DC power source could generally be an electrochemical cell (i.e., a battery). In an embodiment of the present invention that is installed in a building, such as an office or home, an AC voltage supply, transformer, and rectifier could be used as the DC power source. In an embodiment of the present invention that is utilized in medical device systems, power could be supplied by both appropriate means internal to the body of a given recipient via an internal battery or external to the body via magnetic or capacitive induction. The DC power source 110 can include a foldback power supply to limit an inadvertent attempt to draw overcurrent from the DC power source.

In addition to acting as a conditioner for the DC power source, the MPC 105 can provide central coordination of all data transmitted within the system: any data transmitted on constituent conductors passes through the MPC. Advantageously, this logical architecture for data transmission within the system 100 allows for a more robust system. Data transmission within the system is possible regardless of how many Nodes or conductors have been disabled or destroyed as long as a continuous or partial path may be found along the constituent conductors to any given Node.

The MPC microcontroller 125 provides central intelligence for the system 100. The transmit and receive lines (TXD and RXD, respectively) of the MPC microcontroller 125 are shown connected to the MPC DFS circuit 120. Also, in the system 100, the digital output lines of the MPC power/comm circuit 121 are connected to the output of MPC DFS circuit 120 on the pair of output power and communication lines (+power/comm 1 line 243 and+power/comm 2 line 244) that run from the MPC DFS circuit 120 to the plurality of Nodes 1 through N, where N can be zero to many in number. The illustrated Nodes are represented as Node 1 (140), Node 2 (160), Node 3 (170) and Node N (180).

Nodes 140, 160, 170, and 180 can include Node microcontrollers 141, 161, 171, and 181, respectively. The Node microcontrollers are used for direct control of measurements, communications to the MPC microcontroller 125, and changes to physical states carried out by the sensor and actuator loads 145, 165, 175, and 185 that are connected to the system 100. In the system 100, the plurality of Nodes 140, 160, 170 and 180 are coupled to MPC DFS circuit 120 in an exemplary serial loop configuration along the conductors from+power/comm 1 line and+power/comm 2 line. In turn, the Nodes 140, 160, 170, and 180 are coupled ultimately to loads 145, 165, 175 and 185, respectively, which may be sensors or actuators as is necessary for a particular application.

Figure 2A:
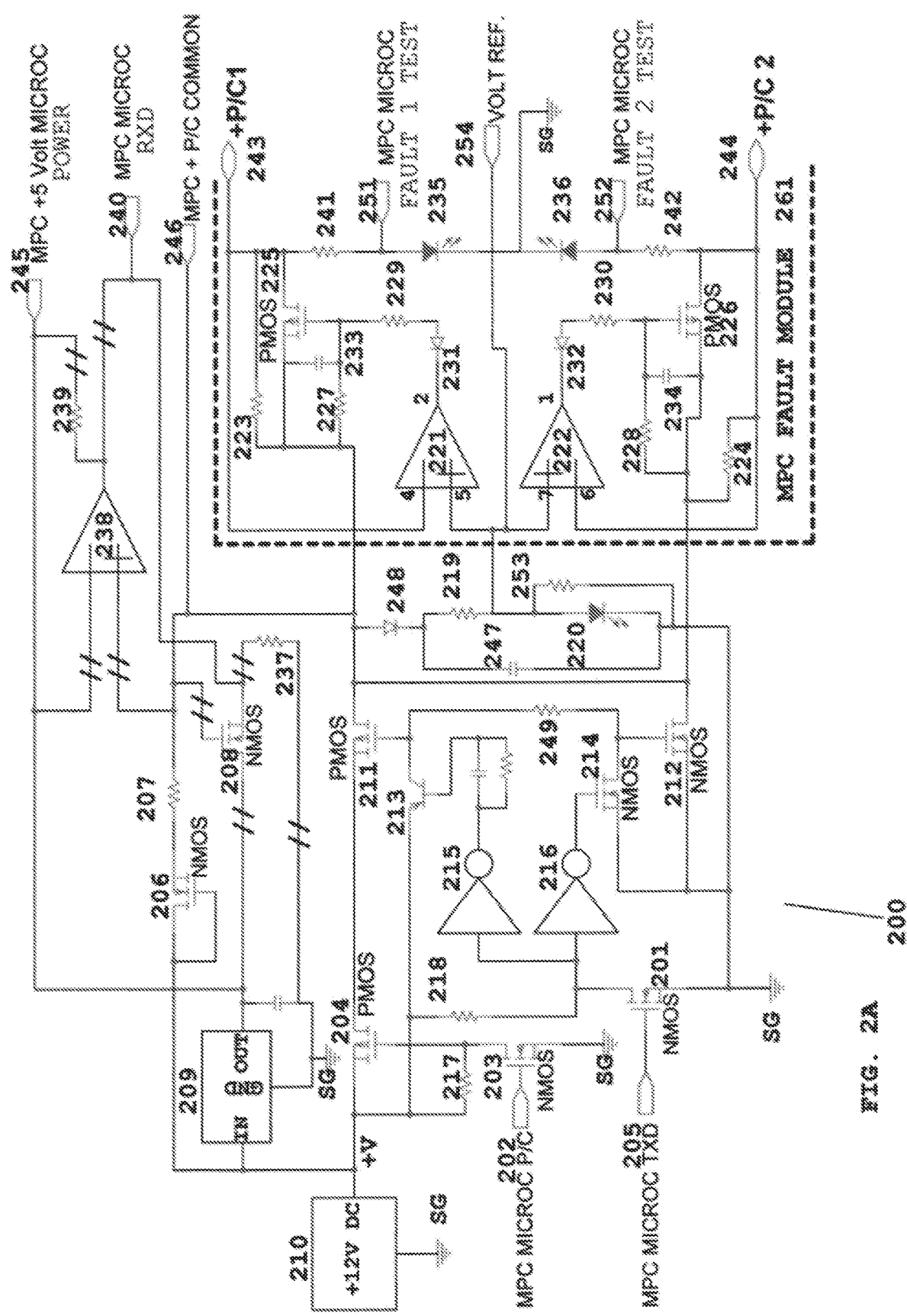
FIG. 2A is a composite schematic diagram of an exemplary embodiment of an overall master power control ("MPC") circuit having power and communications, short control, and microcontroller data transmitter ("TXD") and receiver ("RXD") circuits.
Figure 2B:
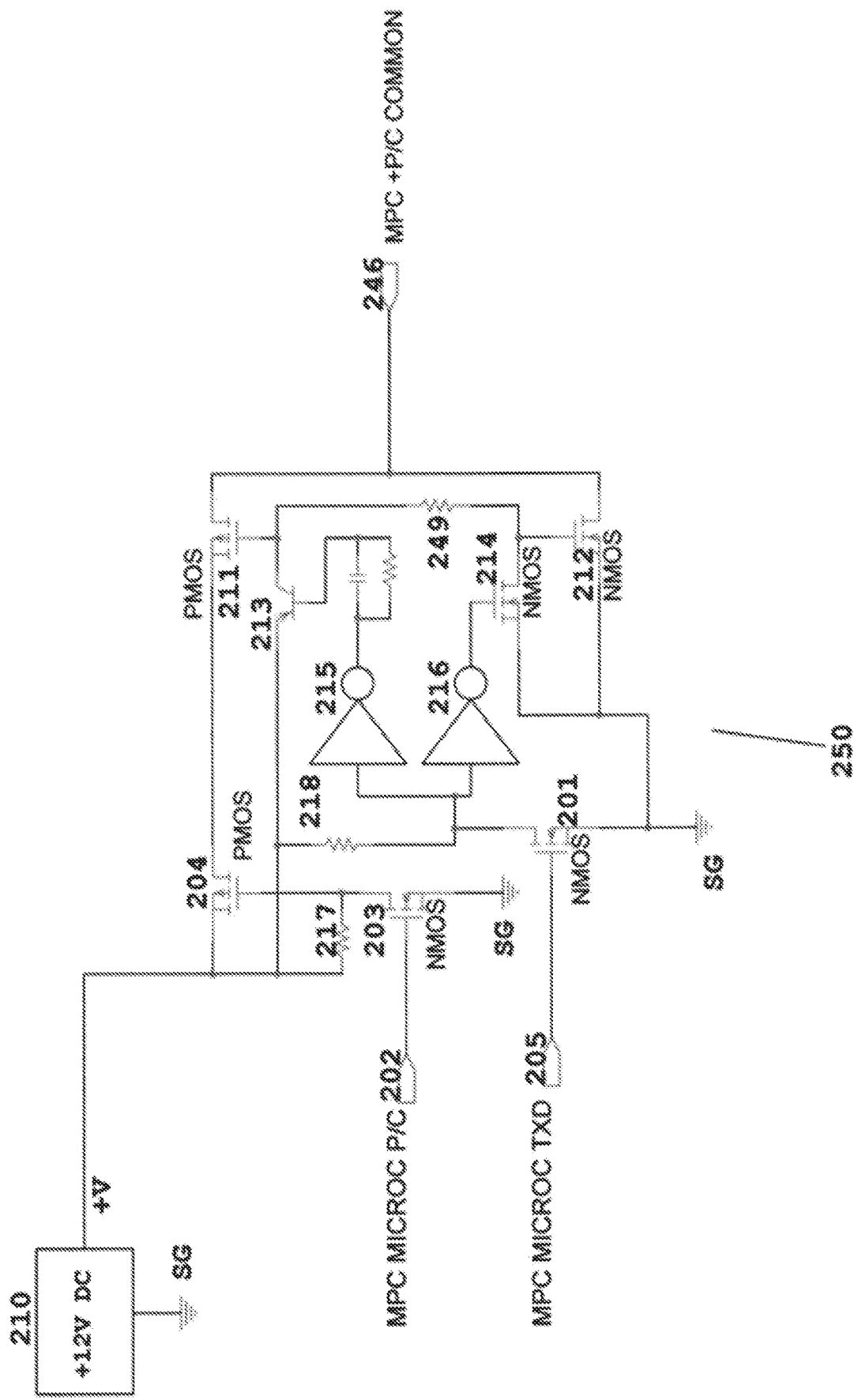
FIG. 2B shows the exemplary MPC power circuit and TXD switch communication circuit portion of FIG. 2A.
Figure 2C:
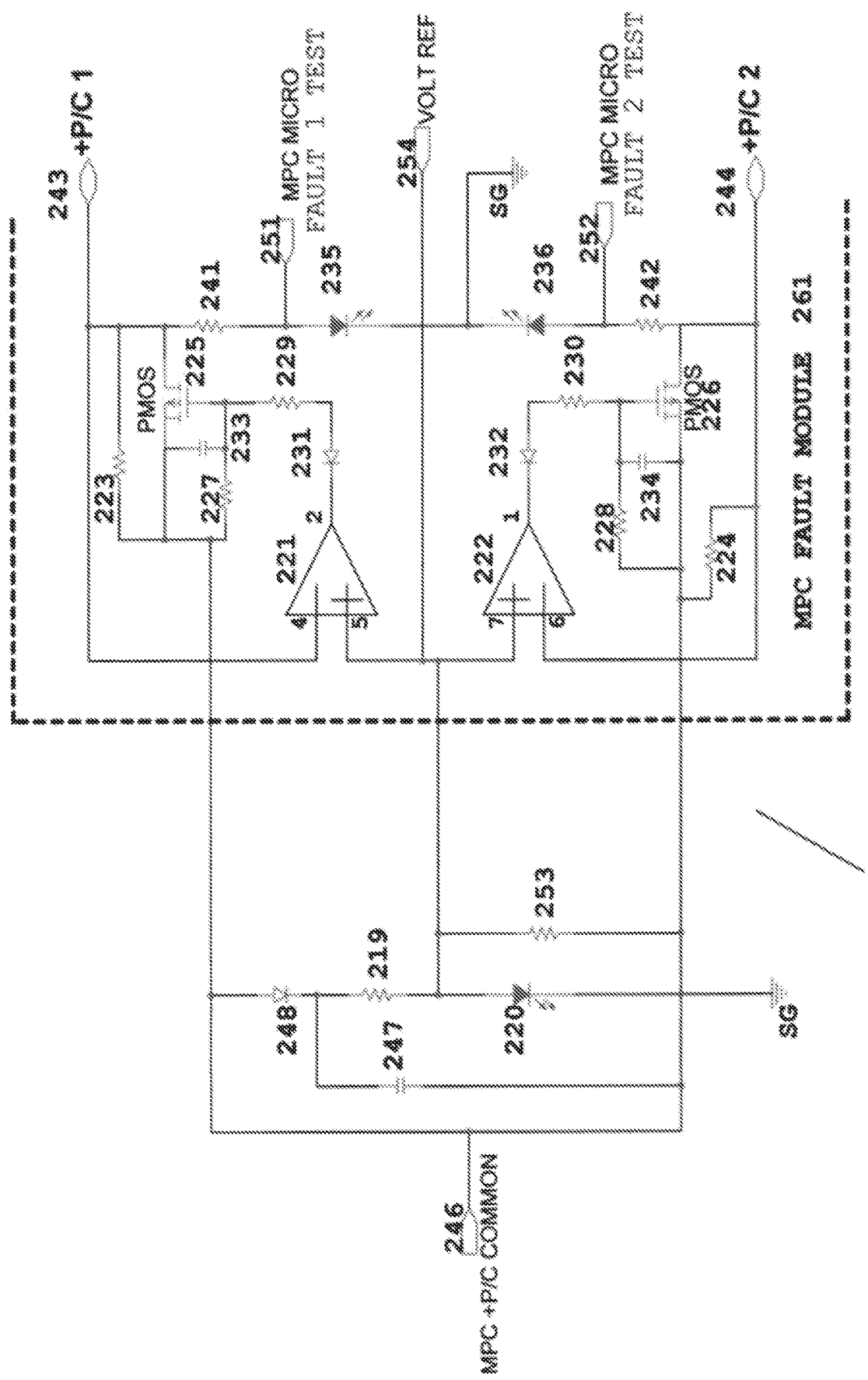
FIG. 2C shows the exemplary MPC fault control circuit portion of FIG. 2A where the exemplary fault can be a short in the system.
Figure 2D:
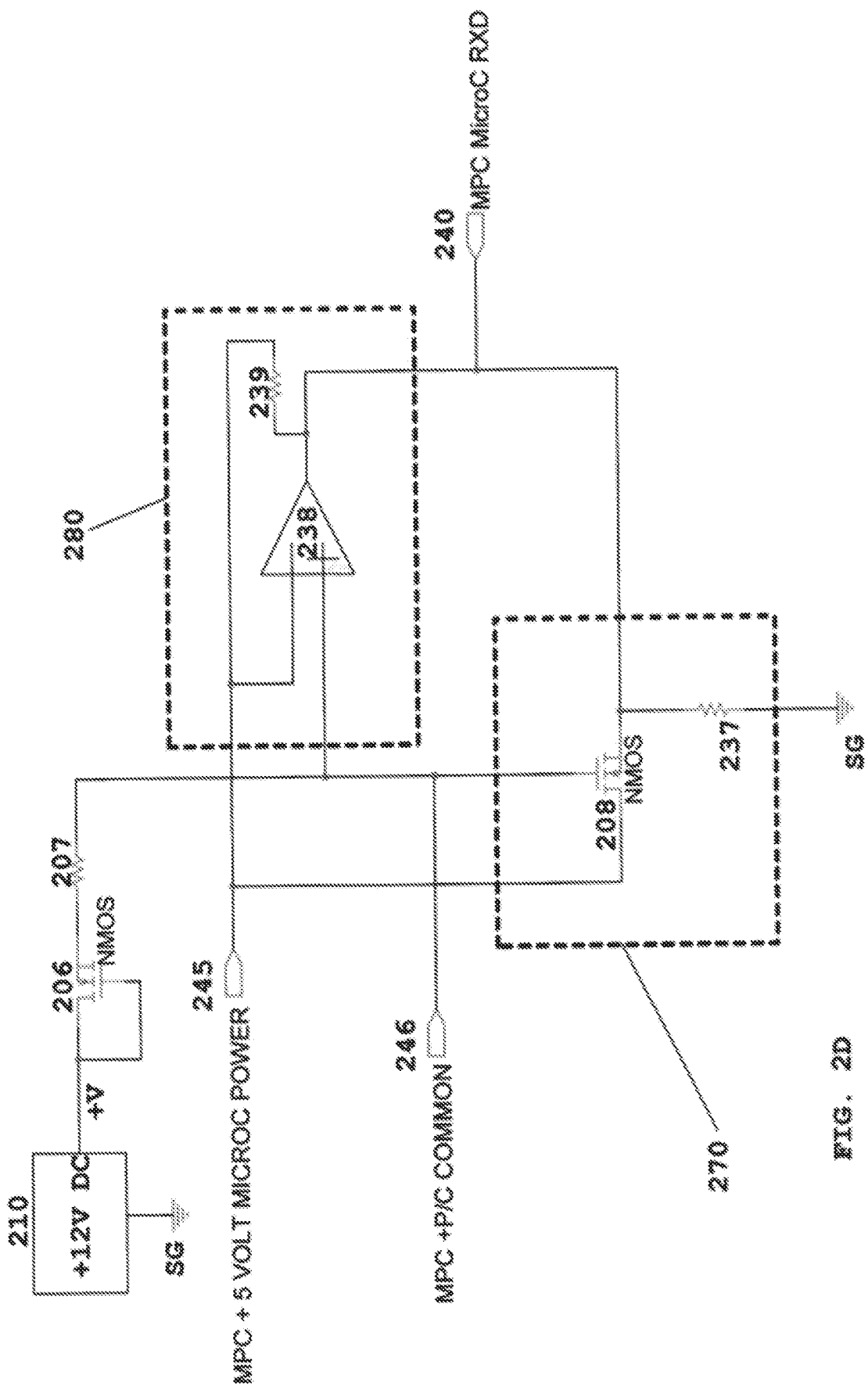
FIG. 2D shows two alternates of the exemplary MPC data receiver circuit portion of FIG. 2A.

FIG. 2A is a composite diagram of an exemplary embodiment of an overall master power control ("MPC") circuit having power and communications, fault control, and microcontroller data transmitter ("TXD") and receiver ("RXD") circuits ("MPC circuit 200"). FIG. 2A illustrates a combined circuit diagram that includes circuits for the MPC 105, MPC DFS circuit 120, and MPC power/comm circuit 121 (from FIG. 1.) without detailing the circuit for the MPC microcontroller 125. FIG. 2B shows the MPC power circuit and TXD switch communication circuit portion of FIG. 2A ("MPC power and communication circuit 250"). FIG. 2C shows the exemplary MPC fault control circuit portion of FIG. 2A ("MPC fault control circuit 260"), where the exemplary electrical fault described herein can be a short in the system and could apply to an open circuit fault as would be known to those with ordinary skill in the art given the disclosure herein. FIG. 2D shows two alternatives of the MPC data receiver RXD circuit portion of FIG. 2A ("MPC data receiver circuit with discrete components 270", and "MPC data receiver circuit with integrated circuit comparators 280"). The figures showing details of the MPC circuit 200 will be described collectively.

An MPC microcontroller power/comm input line 202 from the MPC microcontroller 125 (from FIG. 1), allows primary power and/or communications capability. An input for MPC transmit data (TXD) line 205 and/or power allows either power or communications signals to the output lines+power/comm 1 line 243 and+power/comm 2 line 244, as the primary bidirectional conductors to all other nodes. The overall circuit includes an MPC power and communication circuit 250 for the constituent Nodes, an MPC fault control circuit 260 with an MPC fault module 261, and an MPC data receiver circuit with discrete components 270 for communications or an alternative data receiver circuit with integrated circuit comparators 280. For expansion of the system with fault control to additional+power/comm lines illustrated for example in FIGS. 7A-8C, described herein, the MPC fault module 261 can be replicated with the components described therein.

A DC power source 210 may be a battery or other power source which possesses a positive (+) DC source with an output designated as+V power and system ground (SG) for the entire system. The+V power goes into a power P-Channel MOSFET ("PMOSFET") 204 as well as the pull-up resistor 217, which is connected to a N-Channel MOSFET ("NMOSFET") 203 whose drain goes to the gate of the power PMOSFET 204. The NMOSFET 203 has an input at its gate from the MPC microcontroller 125 (from FIG. 1) that controls the main power and/or communications for the system. The+V power also goes to pull-up resistor 218, which is the pull-up transistor for NMOSFET 201. The gate of NMOSFET 201 is connected to the MPC TXD line 205 of the MPC microcontroller 125. Control from this MPC TXD line 205 allows the main switching for the system 100 (from FIG. 1). Also,+V power goes to the drain and gate of NMOSFET 206. As an alternative, the element 206 could include in addition to or in lieu of to the NMOSFET 206, a Zener diode, LED such as a green LED, or a voltage reference circuit to drop the voltage and advantageously hold to a specific voltage. As a further alternative, a diode could replace NMOSFET 206 and the anode of the diode coupled to the MPC+5 volt microcontroller power line 245 with appropriate bias adjustments made throughout the system, as would be understood by those with ordinary skill in the art given the disclosure herein.

A positive signal at MPC microcontroller power/comm input line 202 from the MPC microcontroller 125 causes NMOSFET 203 to turn on (activate) PMOSFET 204, which then provides positive power to the power PMOSFET 211, supplying positive high current power to the system through MPC+power/comm common line 246.

Diode 248 is connected to MPC+power/comm common line 246 through the anode of diode 248, and the cathode of diode 248 is connected to resistor 219 and capacitor 247. Resistor 219 is connected to the anode of LED 220, resistor 253, pin 5 of comparator 221, pin 7 of comparator 222, and voltage reference line 254. The anode of LED 220 (green with forward voltage of 2.5-3.4V) provides a voltage reference for the+inputs of pin 5 of comparator 221 and pin 7 of comparator 222. Resistor 253 can be used in addition to the LED 220 to help drain the capacitor 247 when voltage is not being supplied to the capacitor 247. System ground SG is connected to capacitor 247, LED 220, and resistor 253. Diode 248 anode allows capacitor 247 to be charged between the cathode of diode 248 and SG. Resistor 219 is connected to the cathode of diode 248 and the+side of capacitor 247, as well as providing current for LED 220. The junction between resistors 219 and 253, and LED 220 along with the capacitor 247 produces a voltage reference at terminal 254 for the inputs 5 and 7 of comparators 221 and 222, respectively, so that comparators 221 and 222 can each function as a voltage level switch. The other side of resistor 253 is connected to SG. When positive power is placed on MPC+power/comm common line 246, capacitor 247 is charged and the LED 220 comes on through this portion of the circuit. When MPC+power/comm common line 246 goes low, capacitor 247 begins to discharge through LED 220, temporarily holding a reference voltage at pin 5 and 7 of comparators 221 and 222. The values of resistors 219, 253, and capacitor 247 are variable depending upon system requirements.

A positive signal at MPC TXD line 205 from the MPC microcontroller 125 will also turn on NMOSFET 201 and via the pull-up resistor 218, which, in turn, will place a high voltage on the output of buffer inverter amplifiers 215 and 216 (CD4049A), which will turn on NMOSFET 214 and turn off the power NMOSFET 212 and turn off the PNP transistor 213 and turn on power PMOSFET 211. Resistor 249 between the NMOSFET 214 and the PNP transistor 213 can assist in avoiding spikes in the circuit by controlling the timing of the PNP transistor operation.

This power, whether positive through power PMOSFET 211 or pulled low or to ground via power NMOSFET 212, is subsequently controlled by MPC TXD line 205 from the microcontroller 125 (from FIG. 1). The power from these two transistors 211 and 212 is fed into the MPC fault control circuit 260 (from FIG. 2C). This power is connected to power PMOSFET 225 and power PMOSFET 226 and connected to the system+power/comm 1 line 243 and +power/comm 2 line 244, respectively. The power from PMOSFET 211 and NMOSFET 212 is also connect to fault-handling resistors 223 and 224 (200 ohm, 2 watts). Integrated circuit comparators 221 and 222 positive inputs are connected to the voltage reference generated by LED 220 and resistor 219. The negative input to IC comparator 221 is connected to the +power/comm 1 line 243 output. The negative input to IC comparator 222 is connected to the +power/comm 2 line 244 output. Under normal circumstances (a no-short condition) the output of comparators 221 and 222 will both be low, turning on power to PMOSFETs 225 and 226, through the respective diodes 231 and 232 (1N4001) through respective resistors 229 and 230. If a system short occurs on main lines,+power/comm 1 line 243 or+power/comm 2 line 244, then the respective outputs of either IC comparator 221 or 222 will go high and turn off the respective power to either PMOSFET 225 or 226. This is accomplished by the turn-off resistors 227 and 228 (470 k ohm), respectively. The turn-off resistor 227 in combination with the capacitor 233 (10 nF) and the resistor 229 form an RC circuit as a passive filter to allow control over the PMOSFET 225. Similarly, the turn-off resistor 228 (470 k ohm) in combination with the capacitor 234 (10 nF) and the resistor 230 form an RC circuit as a passive filter to allow control over the PMOSFET 226. If a short occurs, for example, on+power/comm 1 line 243, then power PMOSFET 225 will be turned-off, as described above, and fault-handling resistor 223 will then supply limited current to+power/comm 1 line 243 to allow a small pull-up current, awaiting the removal or correction of the short. The same would occur with the other comparator 222 and fault-handling resistor 224. The+power/comm 1 line 243 and+ power/comm 2 line 244 are connected to indicator LEDs 235 and 236 (red with forward voltage of 1.2-1.6V) to visibly indicate a good connection. Resistors 241 and 242 limit current to the LEDs 235 and 236, respectively. MPC microcontroller fault 1 line 251 between the resistor 241 and the LED 235 can be used to indicate a fault, as a fault indicator, in the system on power/comm 1 line 243. Similarly, MPC microcontroller fault 2 line 252 between the resistor 242 and the LED 236 can be used to indicate a fault, as a fault indicator, in the system on power/comm 2 line 244.

When the MPC microcontroller power/comm input line 202 signal from the MPC microcontroller 125 (from FIG. 1) goes low, power PMOSFET 204 is turned off. NMOSFET 206 which is always on, produces a voltage drop from+V power through to network communications NMOSFET 206 and resistor 207 (100 ohms) as a voltage level sensor.

This line is subsequently connected to the MPC data receiver circuit 270 in FIG. 2D with discrete components. The MPC data receiver (RXD) circuit 270 includes the gate of NMOSFET 208, whose drain is connected to the output of voltage regulator 209. MPC+5 Volt microcontroller power line 245 is also connected to the output of voltage regulator 209 and provides power to the MPC microcontroller 125 for the nonlimiting exemplary+5 Volt illustrated herein. The connection between network communications resistor 207 and the gate of NMOSFET 208 is connected to the main output power line between power PMOSFET 211 and power NMOSFET 212. This circuit 270 allows communication from the Nodes within the system 100 to be detected and transmitted via the source of NMOSFET 208 and the pull-down resistor 237 to an MPC microcontroller RXD line 240 for network communications input to the MPC microcontroller 125 (from FIG. 1).

An alternative MPC data receiver (RXD) circuit embodiment is also illustrated in FIG. 2D by the MPC data receiver circuit with integrated circuit comparators 280. This circuit can be an alternative to the NMOSFET 208 and resistor pull-down 237 of the circuit 270 by replacing NMOSFET 208 and pull-down resistor 237 with a comparator 238 (LM339, U9B) and pull-up resistor 239, as also shown in FIG. 2D. The negative input to comparator 238 is connected to the+5 Volt output of voltage regulator 209 in MPC power/comm circuit 121 (from FIG. 1). One side of pull-up resistor 239 is also connected to the+5 Volt output of voltage regulator 209 and to MPC+5 Volt microcontroller power line 245. The other side of pull-up resistor 239 is connected to the output of comparator 238 and to the output of MPC microcontroller RXD line 240. The positive input to comparator 238 is connected to one side of network communications resistor 207 and to the drain of power PMOSFET 211 and power NMOSFET 212. Communications signals on+power/comm 1 line 243 and+power/comm 2 line 244 will be translated to network communications resistor 207 and to the+input of comparator 238, which will cause the output to shift, producing data for MPC microcontroller RXD line 240 into the communications port of the MPC microcontroller 125.

Figure 3A:
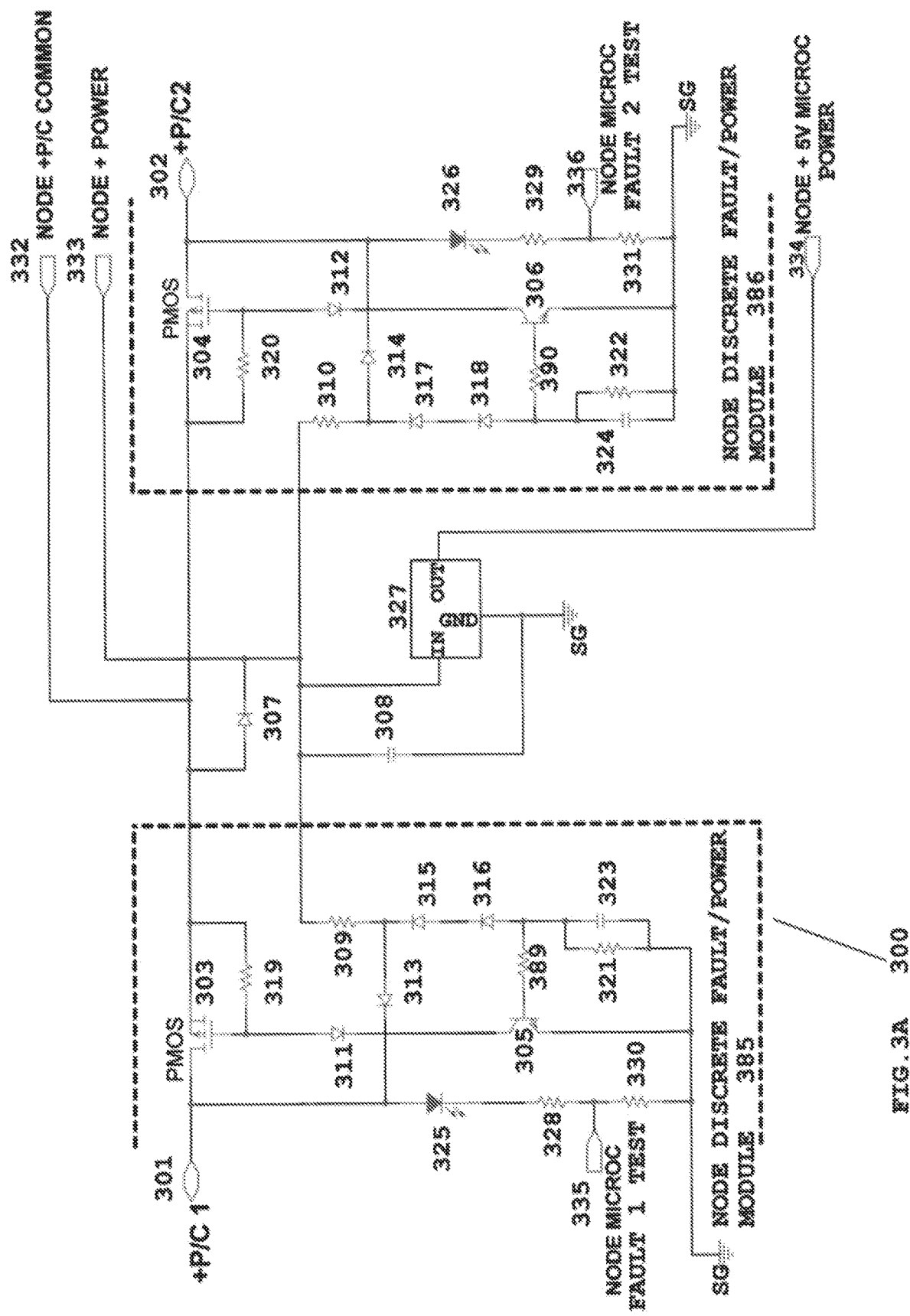
FIG. 3A shows an exemplary embodiment of a Node fault and power handling circuit with discrete components for an exemplary Node illustrated in FIG. 1.

FIG. 3A shows an exemplary embodiment of a Node fault and power handling circuit 300 with discrete components ("Node discrete fault and power circuit") for an exemplary Node illustrated in FIG. 1. The Node discrete fault and power circuit can automatically and temporarily turn off power from at least one of the power and communication lines to a portion of the Node upon the occurrence of an electrical fault to the Node from such power and communication line, and allow power from another power and communication line coupled to the Node to power the Node. The Node fault and power circuit can automatically communicate the fault to the main power controller, other Nodes coupled to the system, or a combination thereof, over a power and communication line that is not turned off. The Node discrete fault and power circuit 300 includes Node discrete fault/power module 385 for Node+power/comm 1 line 301 and Node discrete fault/power module 386 for Node+power/comm 2 line 302. Node+power/comm 1 line 301 from the Node can be coupled with the power/comm 1 line 243 from the MPC 105, and Node+power/comm 2 line 302 can be coupled with+power/comm 2 line 244 from the MPC 105. Other power/comm lines can be similar coupled and the element numbers generally reflect the perspective of a power/comm line relative to the MPC 105 such as in FIG. 2A or a power/comm line relative to a Node such as in FIG. 3A, even though in practice, the lines may be the same current path (with perhaps intervening terminals) and therefore can be used interchangeably. Another embodiment of the Node fault/power modules includes an integrated circuit as described in reference to FIG. 3B below, where those Node fault/power modules can be used in lieu of these Node discrete fault/power modules or in a mixture with a Node discrete fault/power module, such as one of each in this two module embodiment. The Node discrete fault and power circuit 300 can include standard transistors, resistors, diodes, and other functionally separable elements, in contrast to integrated circuit comparators, described in FIG. 3B. Another alternative is inclusion a microcontroller for at least some of the functions of the components. For expansion of the system to additional+power/comm lines illustrated for example in FIGS. 7A-8C, described herein, the Node discrete fault/power modules 385 and 386 can be replicated with the components described therein.

Consider power entering the representative Node via Node+power/comm 1 line 301 or Node+power/comm 2 line 302, or both.+Power/comm 1 line 301 provides power through the intrinsic forward-biased diode of power PMOSFET 303 that allows positive current flow into the main power circuit for the Node. Similarly, Node+power/comm 2 line 302 provides power through the intrinsic forward-biased diode of power PMOSFET 304 that allows positive current flow into the main power circuit for the Node.

If a short occurs on+power/comm 1 line 301, but does not occur on Node+power/comm 2 line 302, then power is fed into the Node via the forward biased diode of power PMOSFET 304. Although there is voltage and current on the source of power, power PMOSFET 303 will not conduct and thereby isolates such short from this Node and the system 100 (from FIG. 1). If no shorts occur throughout the system, then both power PMOSFETs 303 and 304 will conduct and allow power to the Node discrete fault and power circuit 300, as shown in FIG. 3A.

As current flows through power PMOSFETs 303 and 304, capacitor 308 (1 uF-100 kuF) will charge through power diode 307. Capacitor 308 can be substituted for a rechargeable battery, depending on the application, and for purposes herein, is included in a broad definition of the term "capacitor". As the charging occurs, current will also flow through sense resistors 309 and 310 (240 ohms) that will, in turn, turn on bipolar transistors or NMOSFETs 305 and 306 through diodes 315 and 316 and diodes 317 and 318, respectively. When NMOSFETs 305 and 306 turn on, they will respectively turn on power PMOSFETs 303 and 304 through optional diodes 311 and 312 respectively. At this point, the Node is fully powered-up. LEDs 325 and 326 (green with forward voltage of 2.5-3.4V) will turn on to indicate Node+power/comm 1 line 301 and Node+power/comm 2 line 302 are functioning properly. These LEDs are activated through resistors 328 and 330, as well as resistors 329 and 331 from Node+power/comm 1 line 301 and Node+power/comm 2 line 302, respectively. The junction and Node microcontroller fault 1 test line 335 between resistors 328 and 330, and the junction and Node microcontroller fault 2 test line 336 between resistors 329 and 331, both go to an integrated Node microcontroller (such as the exemplary Node microcontrollers 141, 161, 171, and/or 181 of Nodes 140, 160, 170, and/or 180 in FIG. 1) to test for line/voltage on the primary Node +power/comm 1 line 301 and Node +power/comm 2 line 302. Node+power line 333 provides the main node power for the Node. Diode 307 (1N4148 to 100 A) allows positive current flow via Node+power/comm 1 line 301 or Node+power/comm 2 line 302, or both into Node+power line 333. The P-side of diode 313 is connected to Node+power line 333 through sense resistor 309. In this embodiment, sense resistor 309 may be a 240 ohm resistor, and may be a different value, as required for the application. The N-side of diode 313 is connected to+power/comm 1 line 301. In a similar manner, the P-side of diode 314 is connected to Node+power line 333 through sense resistor 310, also indicated as 240 ohms as a nonlimiting example. The N-side of diode 314 is connected to Node+power/comm 2 line 302.

If, for instance, Node+power/comm 1 line 301 shorts to ground, the short is detected by diode 313, pulling down the voltage at the junction of diodes 313 and 315 and sense resistor 309. This, in turn, also pulls down the voltage at diode 315, turning off either a NPN bipolar transistor or NMOSFET 305. The turn-off time of NMOSFET 305 is delayed by the resistor 321 and capacitor 323 as a RC filter. Such delay gives adequate time to the system 100 (from FIG. 1) to allow power PMOSFET 303 to remain on for microseconds to milliseconds which will allow the time for communications to be transmitted throughout the network via+power/comm 1 line 301. The other side of the node at Node+power/comm 2 line 302 is also connected to a similar network of resistors, diodes, transistors and RC network to allow the same or similar delay on power PMOSFET 304 to transmit power throughout the system. If a short of longer duration than is allowed by the RC network of resistor and capacitor 321 and 323, respectively, or resistor and capacitor 322 and 324, respectively, then the system will consider a short has occurred and turn off power PMOSFET 303 through resistor 319 or power PMOSFET 304 through resistor 320. If a short occurs on+power/comm 1 line 301, power PMOSFET 303 will shut-off after several microseconds to milliseconds, depending on the application, and stays off until the short is removed or corrected. If there is simultaneously no short at Node+power/comm 2 line 302, then power PMOSFET 304 will not turn off and power to the Node+power line 333 will remain available to power the Node and communications throughout the system. When and if the short at Node+power/comm 1 line 301 is removed or corrected, then power PMOSFET 303 will again turn on and the system can be restored to normal operation. When such a short is removed or repaired, the sense resistor 309 (which continuously or periodically attempts to pull-up the shorted line+power/comm 1 line 301) through diode 313 allows bipolar transistor or NMOSFET 305 to turn on and subsequently turn on power PMOSFET 303 through diode 311 and power through the Node+power/comm 1 line 301 is restored to the Node.

If, for instance, an open condition occurs after Node+power/comm 1 line 301 has been shorted, (that is, the power line is cut or damaged and the short condition is removed or corrected), then the same correction occurs as described above when such a short is removed. This occurs on any Node+power/comm 1 line 301 or Node+power/comm 2 line 302.

When power is fully supplied to the Node and is available at Node+power line 333, voltage regulator 327 (LM140-5) can be activated and the output of voltage regulator 327 is capable of supplying regulated voltage and power to the constituent Node, such as through Node+5 Volts microcontroller power line 334. The voltage regulator 327, diode 307, and capacitor 308 can provide power to the corresponding Node+power line and Node+5 volts microcontroller power line for each Node fault/power module in this and other embodiments disclosed herein.

Figure 4A:
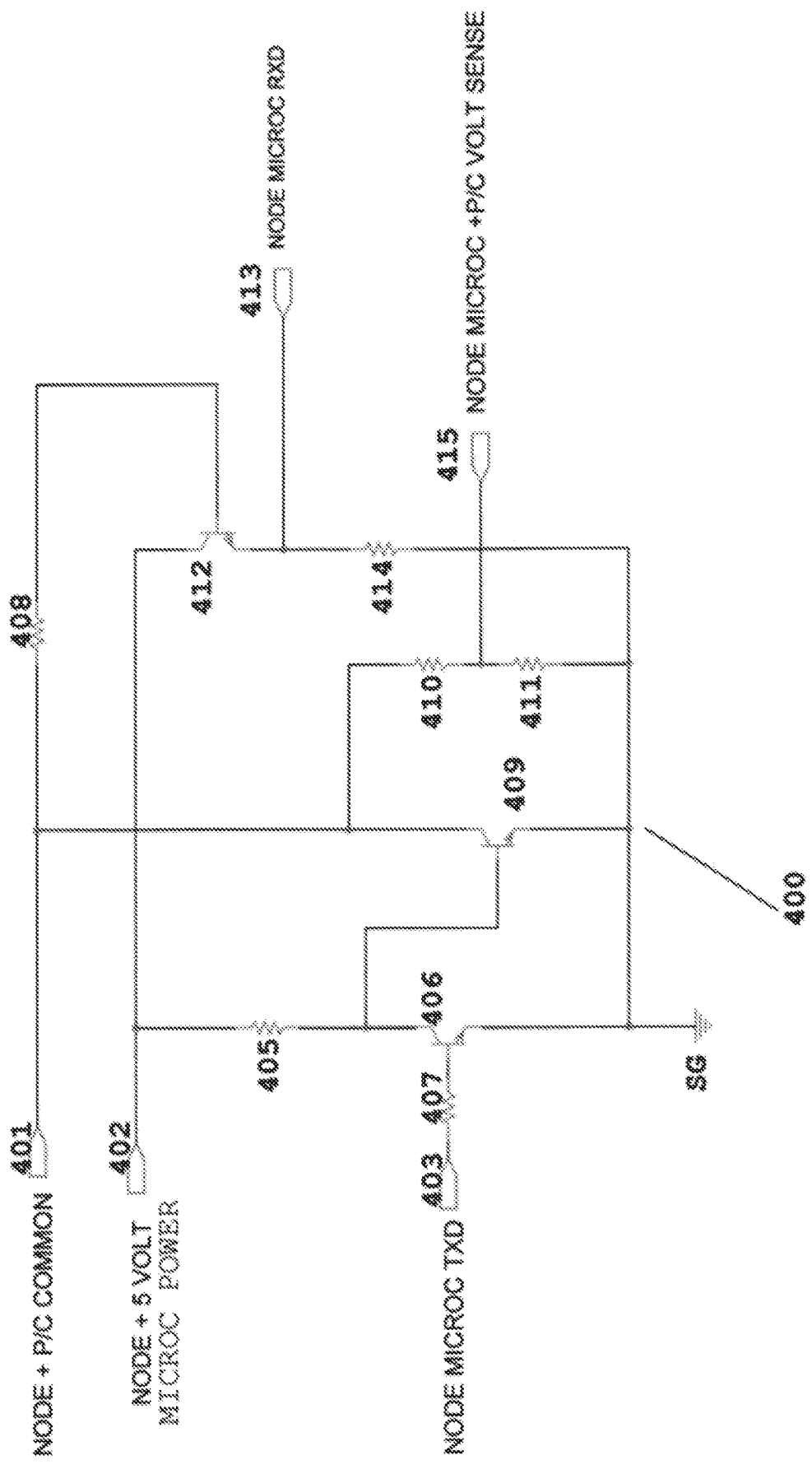
FIG. 4A shows a diagram of an exemplary embodiment of a Node communications circuit using discrete components.

For communications throughout the system, Node+power/comm line common 332 can be pulled to ground from the communications portion of the Node, as shown in FIGS. 4A and/or 4B as permitted by the MPC 105 (from FIG. 1).

Figure 3B:
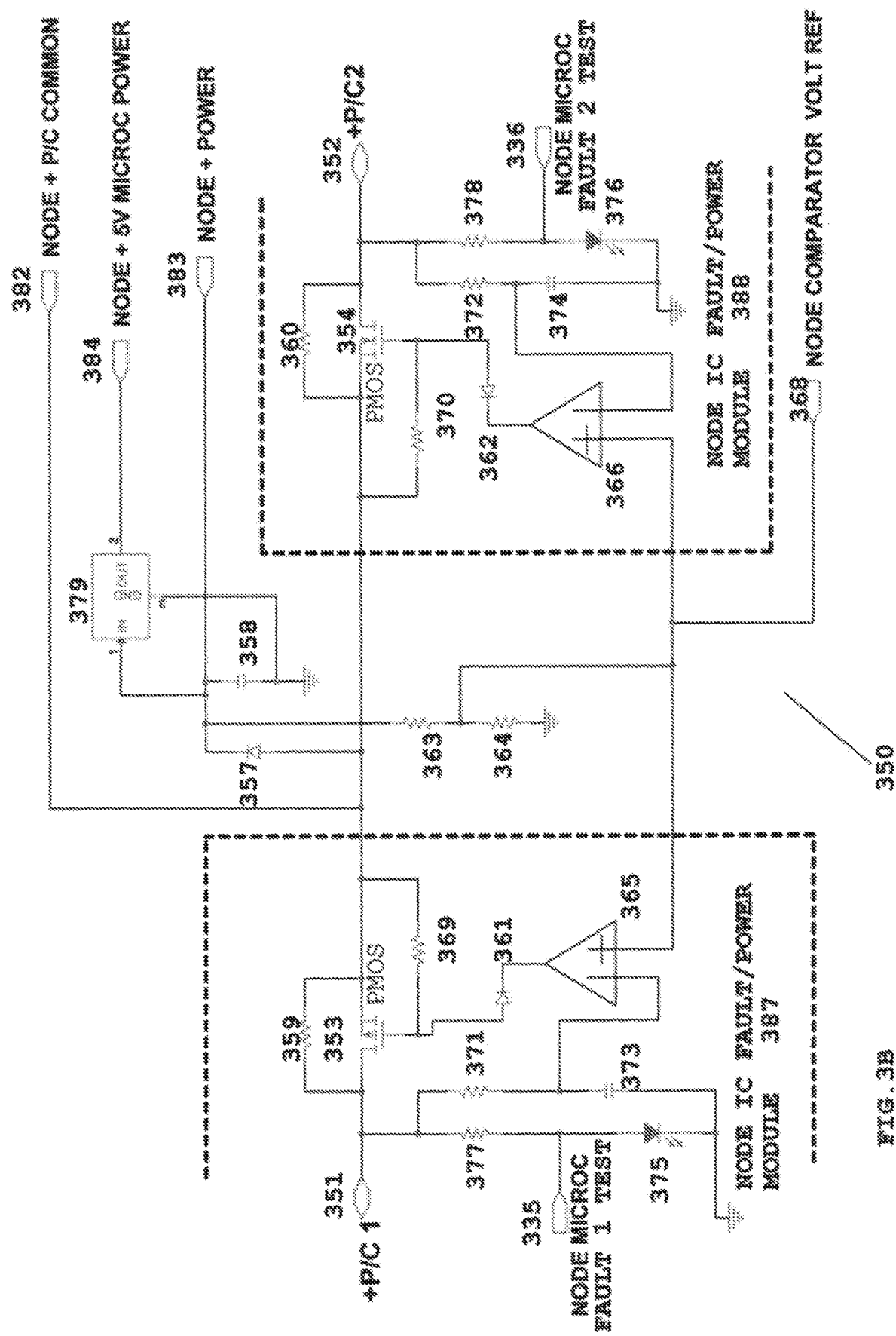
FIG. 3B shows a diagram of an exemplary embodiment of a Node fault and power handling circuit with integrated circuit comparators for an exemplary Node illustrated in FIG. 1.

FIG. 3B shows a diagram of an exemplary embodiment of a Node fault and power handling circuit with integrated circuit comparators ("Node IC fault and power circuit", and when referring to either the Node discrete fault and power circuit or the Node IC fault and power circuit as a "Node fault and power circuit") for an exemplary Node illustrated in FIG. 1. The Node IC fault and power circuit 350 includes Node IC fault/power module 387 for Node+power/comm 1 line 351 and Node IC fault/power module 388 for Node+power/comm 2 line 352. For expansion of the system to additional+power/comm lines illustrated for example in FIGS. 7A-8C, described herein, the Node fault/power modules 387 and 388 can be replicated with the components described therein.

Similar to the Node discrete fault and power circuit 300 in FIG. 3A, power enters the Node IC fault and power circuit 350 from Node+power/comm 1 line 351 and Node +power/comm 2 line 352, corresponding to Node+power/comm 1 line 301 and Node +power/comm 2 line 302, respectively in FIG. 3A. Power and communications signals come into and out of Node IC fault and power circuit 350 via Node+power/comm common line 382. When power is applied, the intrinsic diode of power PMOSFETs 353 and 354 will conduct and begin charging the Node. As the Node charges and the Node capacitor 358 (1 uF-100 kuF or rechargeable battery) is charged through diode 357, both outputs of the comparators 365 and 366 go to ground, turning on the power PMOSFETs 353 and 354, respectively. The sense voltage for the positive input of the comparators 365 and 366 is set at the junction between resistors 363 and 364. This point is adjustable, as needed, depending on application and system requirements.

The lows on the outputs of comparators 365 and 366 pull down current through diodes 361 and 362 through resistors 369 and 370 to turn on their respective power PMOSFETs 353 and 354. The large-gate capacitances of the power PMOSFETs 353 and 354 act as the capacitor in a RC filter to slow down the turn-off condition for both power PMOSFETs 353 and 354. An RC network is attached to each negative input of comparators 365 and 366 via resistors 371 and 372 and capacitors 373 and 374, respectively, which delay the turn-off and turn-on of the comparators 365 and 366. Node comparator voltage reference 368 can be used to trigger actions of the Nodes on the system.

Attached to the input Node+power/comm 1 line 351 and Node+power/comm 2 line 352 are two LEDs 375 and 376 (green with forward voltage of 2.5-3.4V) respectively, through their current control resistors 377 and 378, as indicators when they are ON, telling the operator that the respective line is powered. When an LED is OFF, it indicates a short condition or other power issue on either Node+power/comm 1 line 351 or Node+power/comm 2 line 352, respectively.

If a short occurs on Node+power/comm 1 line 351 or Node+power/comm 2 line 352, and the respective power PMOSFET 353 or 354, then its corresponding resistor 359 or 360 (240 ohms) will generally be conducting a small current in a constant attempt to pull the respective line Node+power/comm 1 line 351 or Node+power/comm 2 line 352 up to a normal voltage condition. When the short is removed or healed from that line, the respective resistor 359 or 360 will pull the line up and allow the comparator 365 or 366 to turn on their respective power PMOSFET 353 or 354.

Capacitor 358 is charged through diode 357. The values of diode 357 and capacitor 358 are dependent on the output power requirement of the Node. Capacitor 358 may be a rechargeable battery, depending on application. The junction between diode 357 and capacitor 358 is the Node+power line 383 for the output requirements of the Node. Also attached to Node+power line 383 is the input to voltage regulator 379 (LM340-5) and its output at Node +5 volts microcontroller power line 384. In this embodiment, 5 volts is illustrated, but may be changed to whatever voltage is required by application. The voltage regulator 379, diode 357, and capacitor 358 can provide power to the corresponding Node+power line and Node+5 volts microcontroller power line for each Node fault/power module in this and other embodiments disclosed herein.

FIG. 4A shows a diagram of an exemplary embodiment of a Node communications circuit with discrete components ("Node comm discrete component circuit"). The Nodes 140, 160, 170, and/or 180 can comprise the Node comm discrete component circuit. The Node comm discrete component circuit 400 allows transmittal data and receive data communication capabilities to and from a Node. Power and communications signals come into and out of Node comm discrete component circuit 400 via Node+power/comm common line 401 from Node+power/comm common line 382, shown in FIG. 3B, or Node+power/comm line common 332, shown in FIG. 3A. Node+power/comm common line 401 is connected to resistor 408, the collector of transistor 409 (2N3904), and resistor 410. The other side of resistor 408 is connected to the base of transistor 412 (2N3904). The collector of transistor 412 is connected to one side of resistor 405 and the Node+5 Volt microcontroller power line 402 from either of Node+power line 333 of FIG. 3A or Node+power line 383 of FIG. 3B. The emitter of transistor 412 is connected to one side of resistor 414 and to the Node microcontroller RXD line 413 for data reception. When Node+power/comm common line 401 goes low during communications, the output of transistor 412 at its emitter will also go low, causing Node microcontroller RXD line 413 of the Node microcontroller data reception input to go low and detect a space on the communications of the Node comm discrete component circuit 400.

When any Node is instructed to send output data on its TXD line, such signal enters circuit 400 via Node microcontroller TXD line 403 through resistor 407 into the base of transistor 406 (2N3904). The emitter of transistor 406 is connected to SG. A high voltage at Node microcontroller TXD line 403 will turn on transistor 406, whose collector is connected to resistor 405 and the base of transistor 409. When transistor 406 turns-on, it will in turn, turn off transistor 409, allowing Node+power/comm common line 401 to go high or place a mark on the communications system through the Node+power/comm common line 401 for transmission of data throughout the network. This is the steady-state condition for power and communications on the Node. Resistors 410 and 411 drop the voltage between them for Node microcontroller +power/comm volt sense line 415 as an A/D line to any constituent microcontroller for a given Node for measuring voltage health at that Node. Transistors 406, 409 and 412 may be substituted with appropriate N-Channel MOSFETS, depending on application or need.

Figure 4B:
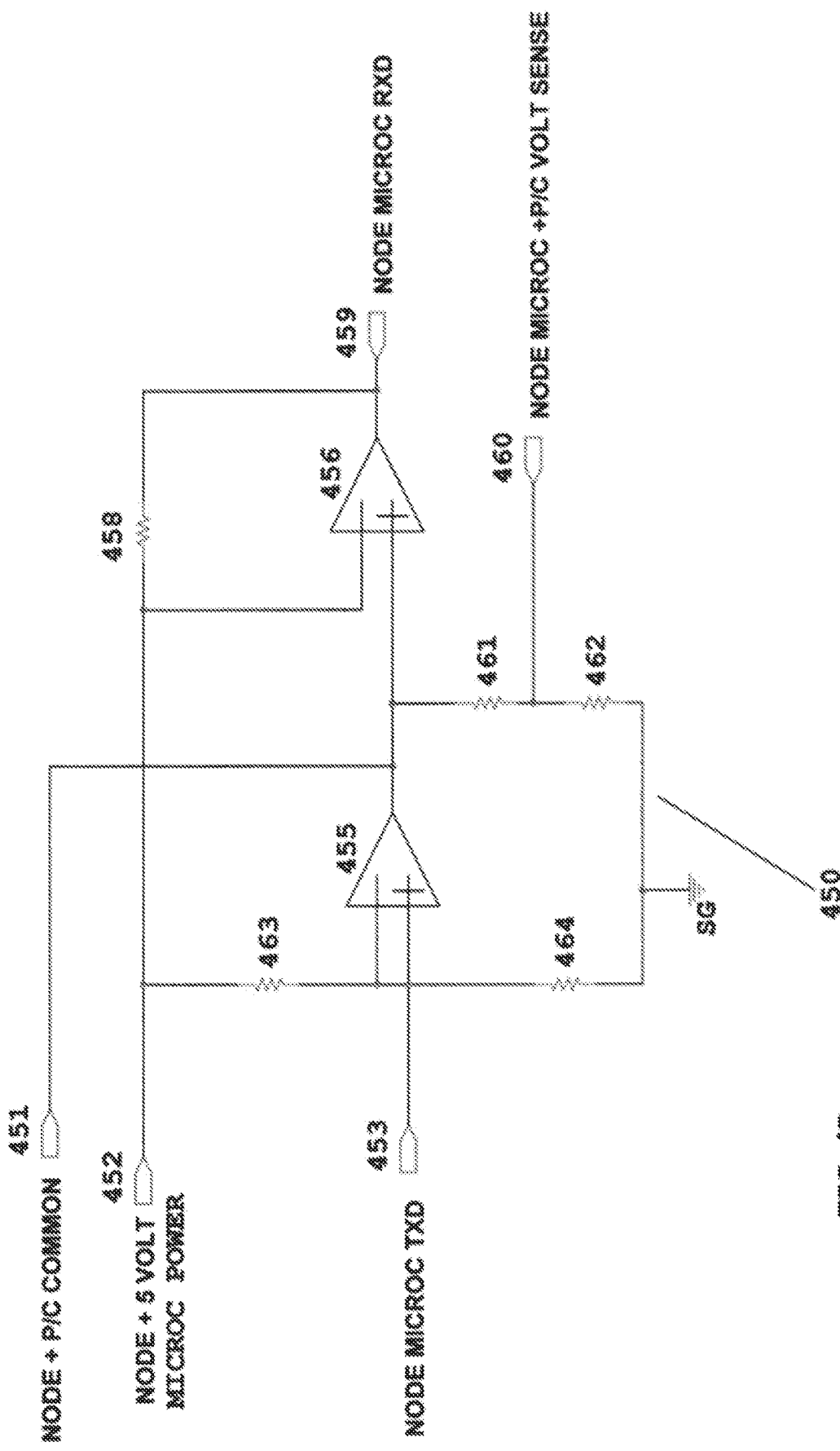
FIG. 4B shows a diagram of an alternative embodiment of a Node communications circuit using integrated circuit comparators.

FIG. 4B shows a diagram of an alternative embodiment of a node communications circuit with integrated circuit comparators. The circuit provides for TXD and RXD communication signals. Power and communications signals come into and out of circuit 450 via Node +power/comm common line 451 from Node+power/comm common line 382, shown in FIG. 3B or Node+power/comm common line 332, shown in FIG. 3A. Node+power/comm common line 382 is connected to resistor 461 (18 k ohms), the output of comparator 455 (LM293) and the +input of comparator 456 (LM293). The other side of resistor 461 is connected to the junction between resistor 462 (10 k ohm) and Node microcontroller+power/comm volt sense line 460. The other side of resistor 462 is connected to SG. Node+5 Volt microcontroller power line 452 goes to the negative input of comparator 456 and to resistors 458 and 463 (10 k ohms). The other side of resistor 463 is connected to resistor 464 and the negative input of comparator 455.

The constituent Node microcontroller TXD line communications signal port is connected to Node microcontroller TXD line 453, which is connected to the positive input of comparator 455.

During system communication the Node+power/comm common line 451 will rise high or go low, depending upon whether it is a communications mark or space, respectively. During a mark condition (high), comparator 455 output is also high or an open collector condition. This high is connected to the +input of comparator 456. The Node+ power/comm common line 451 voltages in the power or mark condition will be higher than Node+5 Volt microcontroller power line 452. This high or mark condition is passed through comparator 456 to Node microcontroller RXD 459 as a mark communication signal to the constituent Node microcontroller receive communications port. A low or ground signal indicating a communication space on Node +power/comm common line 451 subsequently allows comparator 456 to go low, indicating a space communications condition on Node microcontroller RXD line 459 to the constituent microcontroller receive communications input port.

A transmit communications of a high at Node microcontroller TXD line 453 will cause comparator 455 output to go to its open collector condition allowing the Node+power/ comm common line 451 to go high. A low from the transmit communications at Node microcontroller TXD line 453 will cause comparator 455 to go low output condition on the Node+power/comm common line 451 and allow a space condition on the system power/comm lines to other constituent Nodes and the MPC 105, shown in FIG. 1.

The junction between resistors 461 and 462 and Node microcontroller +power/comm volt sense line 460 goes into an A/D input on the constituent microcontroller for Node voltage/power health. Prior to the microcontroller transmitting data on the Node microcontroller TXD line 453, the Node microcontroller (such as Node microcontroller 141 on Node 140 from FIG. 1) should sense an MPC release Node mark voltage 502, as indicated on FIG. 5. Such condition indicates that MPC microcontroller power/comm input line 202 of the MPC 200 has turned off PMOSFET 204, allowing NMOSFET 206 and network communications resistor 207 to supply system NODE communications on the network. If this condition is not met and a space condition is sent via Node microcontroller TXD lines 403 or 453, this will likely cause damage to transistor or NMOSFET 406 and/or comparator 455.

Figure 5:
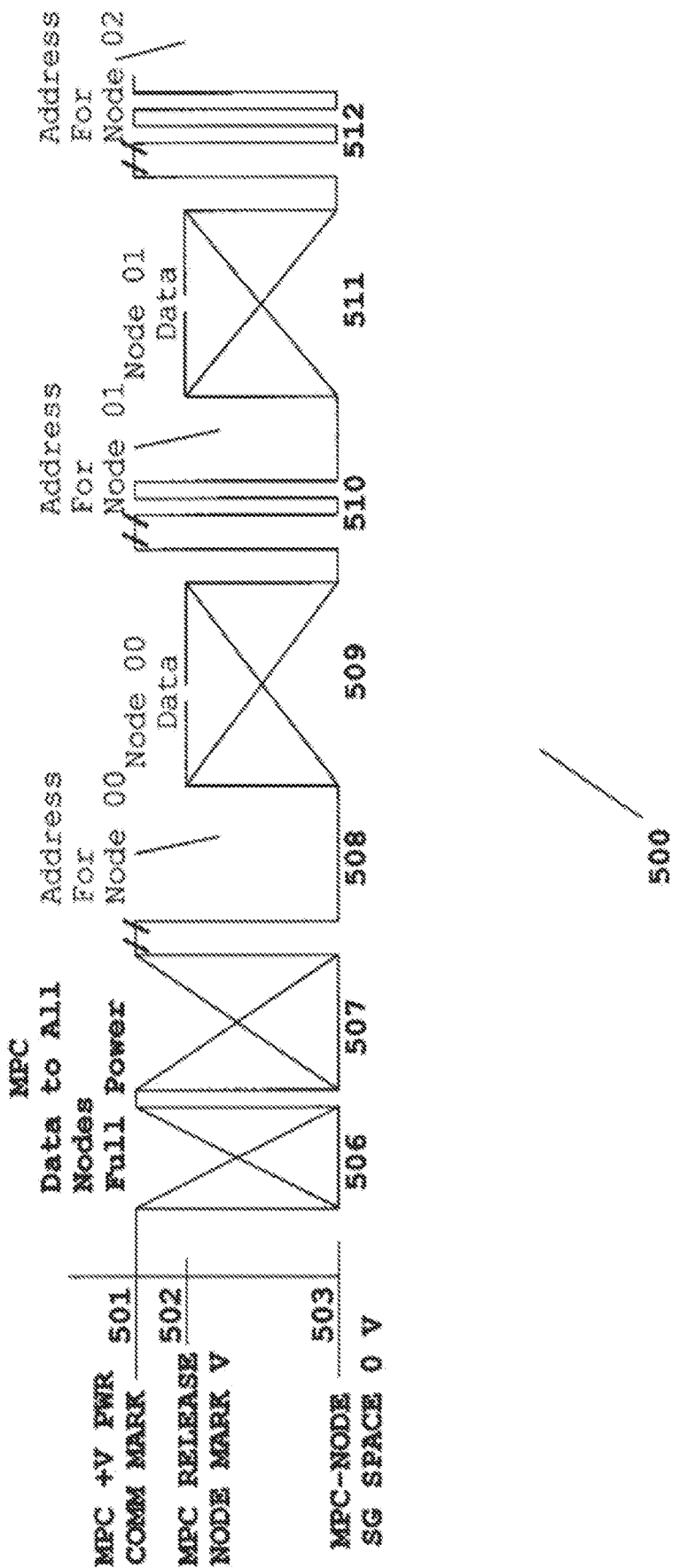
FIG. 5 is a graphic representation of an exemplary embodiment of a data and system communication protocol.

FIG. 5 is a graphic representation of an exemplary embodiment of data and system communication protocol. The data and system communication protocol 500 allows a Node to transmit power and/or data simultaneously over a provided conductor. The upper portion of FIG. 5 shows a first level of power and voltage, MPC Main Control Power and Comm Mark voltage ("MPC+V power/comm mark voltage") 501 of MPC 105 from FIG. 1 as the main power and voltage from the MPC. MPC Main Control Release and General System Data from Nodes voltage ("MPC release Node mark voltage") 502 represents a lower second level of power and voltage as the communications voltage level on the system during non-MPC Node power/communication where the Nodes can transmit data. MPC System Ground Node for Power and Comm Space voltage ("MPC Node SG space voltage") 503 represents a third level as the system ground and/or space for the system 100 (from FIG. 1) during which the Node can communicate with the MPC and/or other Nodes for a space communications condition between the MPC release Node mark voltage 502 to the MPC Node SG space voltage 503.

In a normal power/communications structure, MPC+V power/comm mark voltage 501 is from the primary power from the MPC to the Nodes. Blocks 506 and 507 represent the MPC control of the system 100 (from FIG. 1) when the MPC power and data to the Nodes is at full power on the +power/comm 1 line 243 and +power/comm 2 line 244 (from FIG. 2A). Address for Node 00 block 508 represents the full power address to Node 00. At the end of the time for block 508, main power is removed from the power/comm line and allowed to be temporarily held-up by network communications resistor 207 (from FIG. 2). This allows a drop in voltage to allow Nodes to communicate throughout the system 100. Node 00 Data block 509 at the constituent Nodes represent the information placed on the power/communication system by Node 00. When the Node 00 has finished sending its data to the system 100, including all relevant Nodes and the MPC, the subsequent illustrated voltage step up to MPC+V power/comm mark voltage 501 represents the MPC again putting full power on the +power/ comm 1 line 243 and +power/comm 2 line 244, and sends data for the Address for Node 01 as the next Node in block 510 via an identifiable sequence for Node 01 compared to Node 00. At the end of this Address, the MPC again allows network communications resistor 207 of FIG. 2 to conduct and drop the voltage level on the power/communications system for block Node 01 Data block 511. Node 01 sends data to the constituent Nodes and the MPC in block Node 01 Data block 511.

At the end of this communication, the MPC again takes control and puts full power on the power/communication system, then again sets-up with an identifiable sequence for Address Node 02 block 512. This structure continues until all relevant Nodes have communicated with the MPC and all constituent Nodes. The full power high voltage spacing between Node communications can vary, depending upon power requirements and condition. A variable time can exist between blocks, such as between block 507 and Address for Node 00 block 508, that can be adjusted according to the application. Surge currents in the system can be accommodated by appropriate amounts of time between power and data communication.

The RC decay time on the MPC circuit in FIG. 2A of turn-off resistor 227, capacitor 233, and the gate capacitance of PMOSFET 225 (as well the RC decay time of turn-off resistor 228, capacitor 234, and the gate capacitance of PMOSFET 226) can be at least one order of magnitude longer than the time for data communications during blocks 509, 511, and so forth, to help assure that power to the system does not turn off while sending the data communications. For the Node discrete fault and power circuit 300 in FIG. 3A, the RC decay time on a Node of resistor 321 and capacitor 323 (as well the RC decay time of resistor 322 and capacitor 324) can be at least one order of magnitude longer than the time for data communications during blocks 509, 511, and so forth to help assure that power to the Node does not turn off while sending the data communications. For the Node IC fault and power circuit 350 in FIG. 3B, the RC decay time on a Node of resistor 371 and capacitor 373 (as well the RC decay time of resistor 372 and capacitor 374) can be at least one order of magnitude longer than the time for data communications during blocks 509, 511, and so forth to help assure that power to the Node does not turn off while sending the data communications.

Figure 6A:
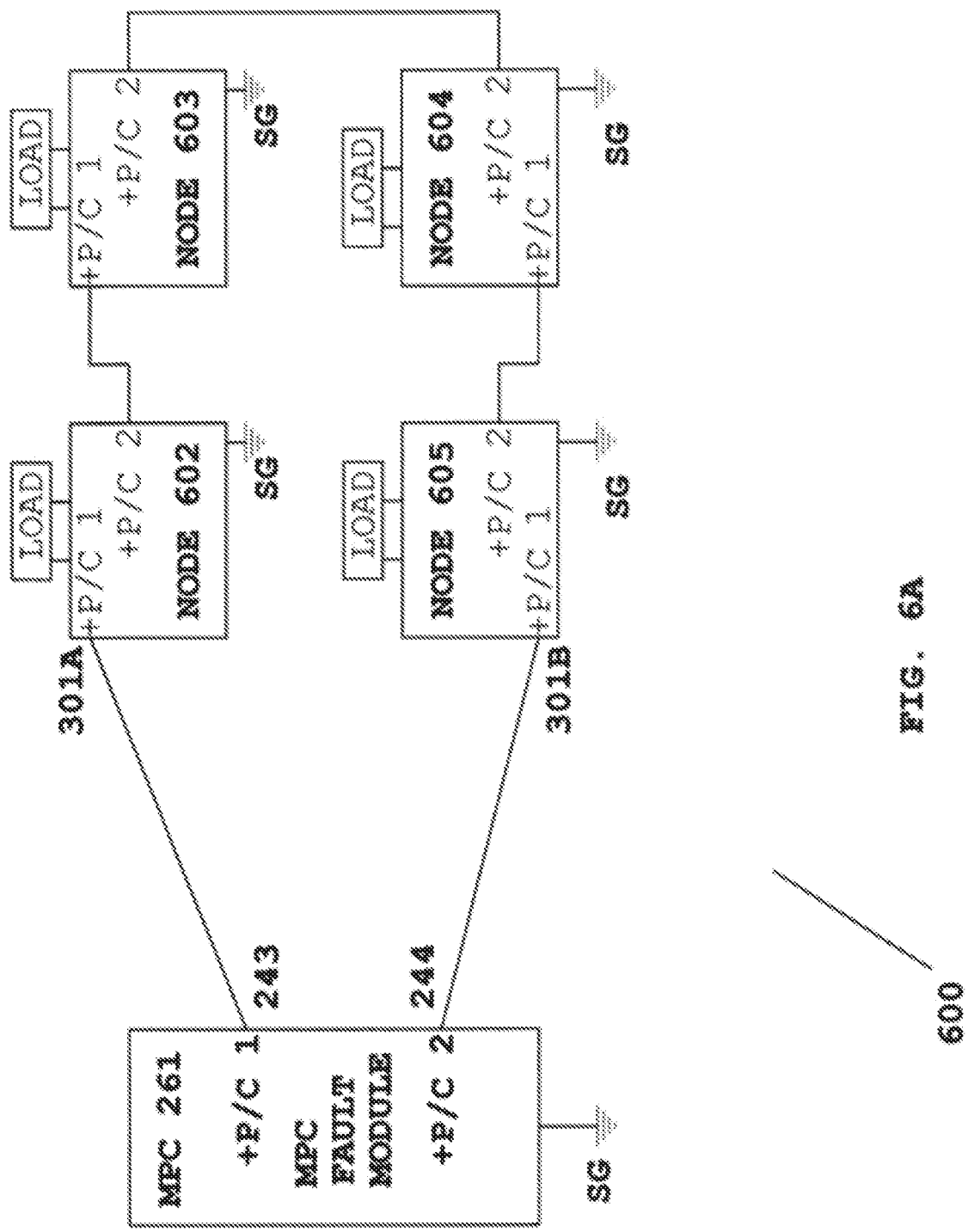
FIG. 6A is a graphic representation of a basic exemplary loop configuration of a system having the MPC and at least one Node.

FIG. 6A is a graphic representation of a basic exemplary loop configuration system 600 having the MPC and at least one Node. MPC 261 can be coupled to the DC power source 110 shown in FIG. 1 and has at least two +power/comm lines that provide power to the system. +Power/comm 1 line 243 of MPC 261 can be coupled with Node 602+power/comm 1 line 301A, equivalent to Node+power/comm 1 line 301 from FIG. 3A. Additional +power/comm lines can be coupled between Node 602 and Node 603, Node 603 and Node 604, and Node 604 and Node 605. Node+power/comm 1 line 301B of Node 605 can be coupled with+power/comm line 2 line 244 of MPC 261 to form a loop configuration in series.

When power is applied to+power/comm 1 line 243 of MPC 261 and then through the Node+power/comm 1 line 301A of Node 602, then (referring to FIG. 3A) PMOSFET 303, diode 307, capacitor 308, resistor 309, and diodes 315 and 316 turn on NMOSFET 305, which then turns on PMOSFET 303 that powers up Node 602. A similar condition occurs through +power/comm 2 line 244 of MPC 261 for Node 605.

If a fault, such as a short-to-ground, occurs between MPC 261+power/comm 1 line 243 and+power/comm 1 line 301A of Node 602, the following is designed to occur. The short will present itself on MPC 261+power/comm 1 line 243. Cross-referencing FIG. 6A with FIGS. 2C and 3A, the short-to-ground creates a low-voltage condition that will be on pin 4 of comparator 221. The voltage reference at pin 5 of comparator 221 is higher than the voltage at pin 4 in this condition, and then the output at pin 2 will go high, allowing the RC network of resistor 227 and capacitor 233 to turn off power PMOSFET 225. Concurrently, the+power/comm 1 line 301A of Node 602 will also go low due to the short to SG condition. This low-voltage in+power/comm 1 line 301A of Node 602 will cause current to flow through diode 313 that will turn off NMOSFET 305 (via RC network resistor 321 and capacitor 323) allowing resistor 319 to turn off power PMOSFET 303. The short between MPC 261+power/comm 1 line 243 and Node +power/comm 1 line 301A of Node 602 is now isolated. A small sustaining current from resistors 223 of the MPC and 309 of Node 602 attempts to restore the system when the short is cleared between the MPC and the Node. MPC 261 can have a similar short between+power/comm 2 line 244 of MPC 261 and Node+power/comm line 1 301B of Node 605 with similar results for MPC 261 and Node 605.

If a short occurs between any two Nodes, for example between Node 602 and Node 603, the following is designed to occur. Again, cross-referencing with FIGS. 2C and 3A, Node 602 +power/comm 2 line will go low (such as 0 V), drawing current through diode 314 and then turning off NMOSFET 306 (via RC network resistor 322 and capacitor 324), in turn turning off power PMOSFET 304 via resistor 320. Concurrently, Node 603+power/comm 1 line will also be isolated by turning off power PMOSFET 303, as described above for Node 602 with a short between MPC 261 and Node 602 in the paragraph above.

Figure 6B:
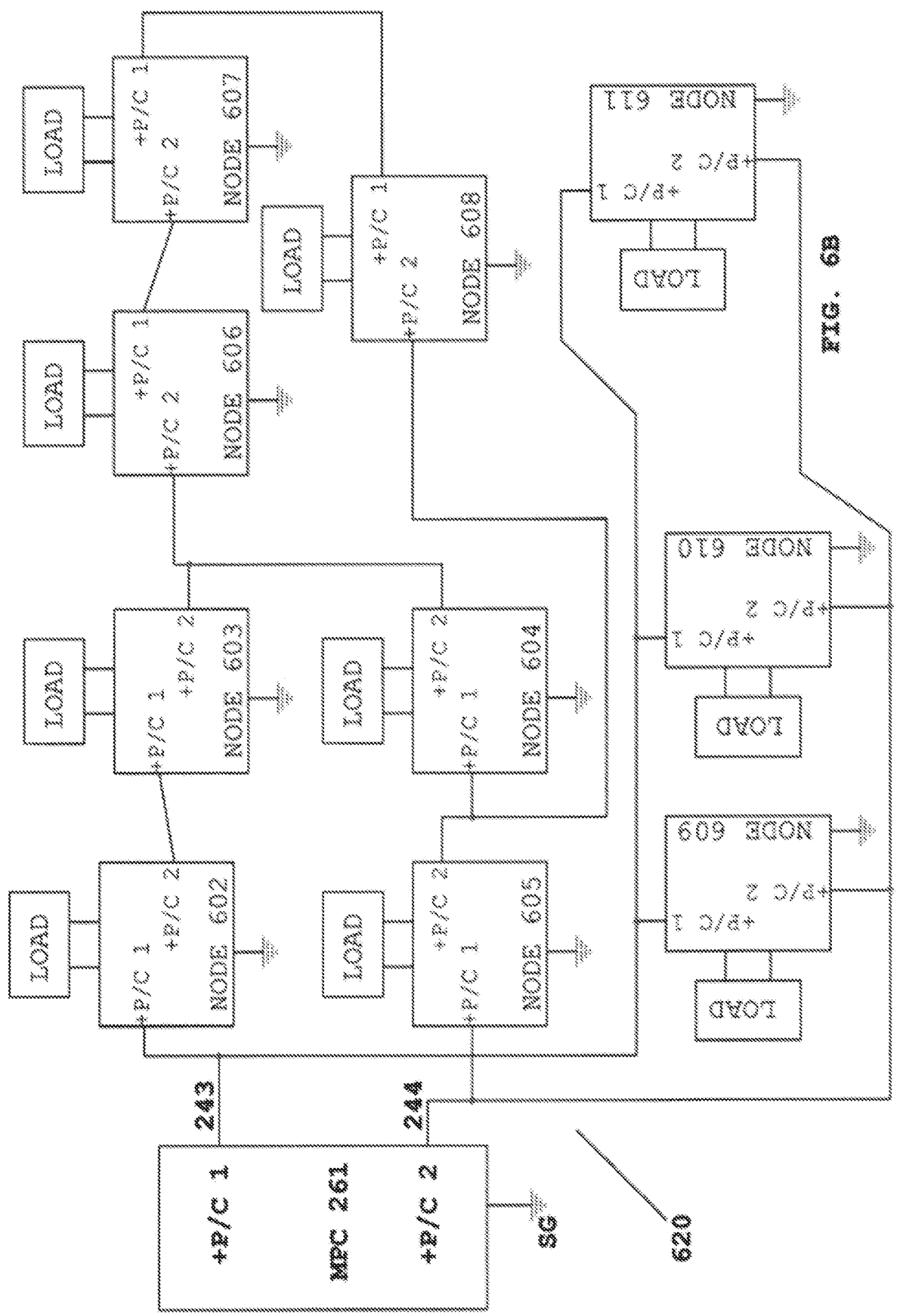
FIG. 6B is a graphic representation of another exemplary loop configuration of a system having the MPC and at least one Node.

FIG. 6B is a graphic representation of another exemplary loop configuration of a system 620 having the MPC and at least one Node. FIG. 6B shows exemplary configurations of an overall loop with subloops that are coupled with the MPC 261 having a+power/comm 1 line 243 and a+power/comm 2 line 244 with Nodes coupled therebetween. Nodes 602, 603, 604, and 605 form a series loop with the MPC. Nodes 606, 607, and 608 form a series subloop that itself is a parallel loop to each of Nodes 603 and 604. Nodes 609, 610, and 611 form a parallel loop with the MPC 261 and a parallel loop relative to the Nodes 602, 603, 604, 605, 606, 607, and 608. Other variations and arrangement are possible and contemplated. The graphic illustrates the flexibility of Node arrangements that can apply the principles of powering and isolation and recovery from faults, as described herein.

Figure 7A:
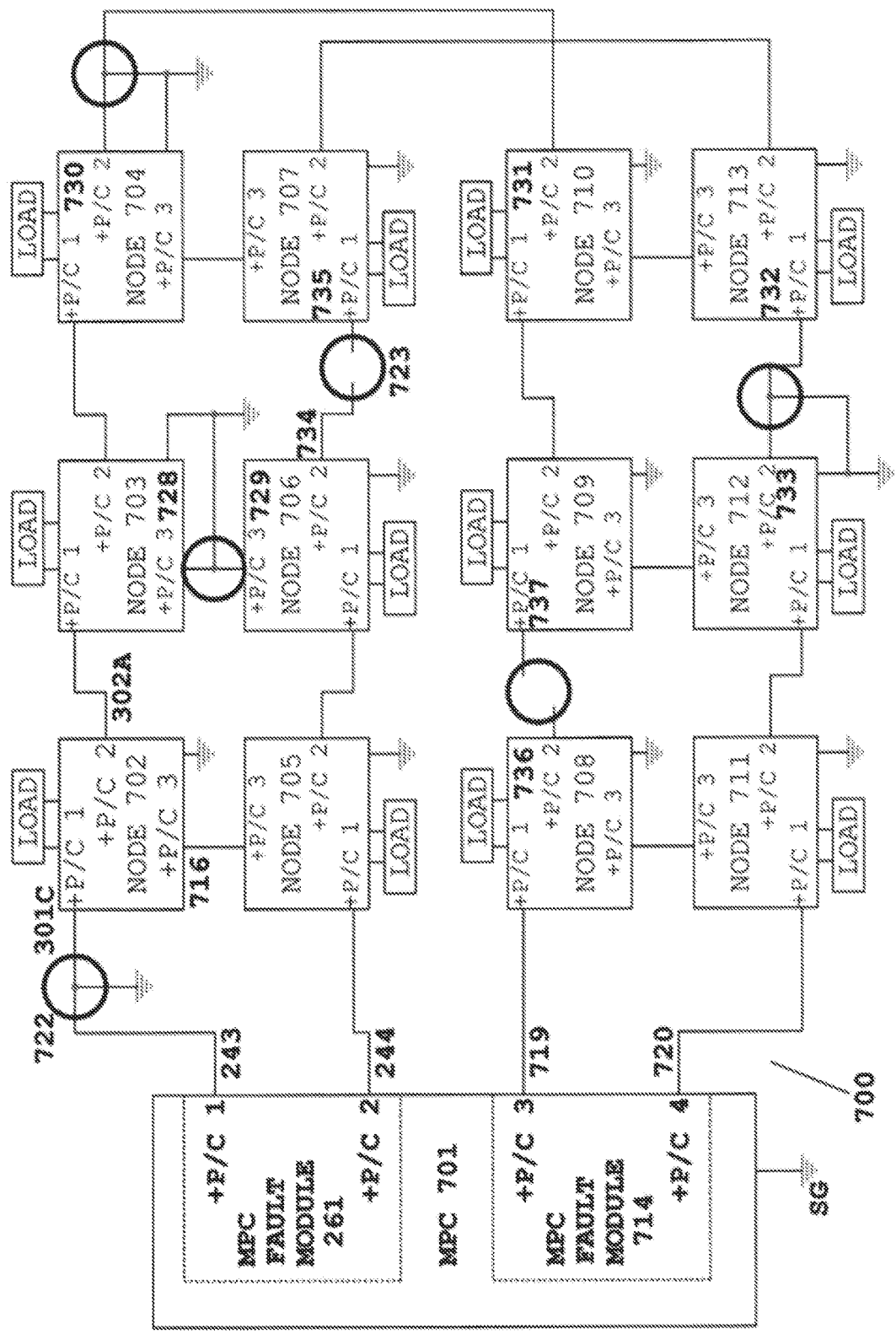
FIG. 7A is a graphic representation of an exemplary modular three-wire loop configuration system showing the MPC and multiple Nodes.

FIG. 7A is a graphic representation of an exemplary modular three-wire loop configuration system 700 showing the MPC and multiple Nodes. The exemplary configuration can be described as a semi-fabric configuration where a plurality of the Nodes can each be coupled with three power/comm lines. Portions of the circuits described above can be considered in a modular form factor for ease of illustration and clarity. Specifically, an MPC 701 can include MPC fault module 261 from FIGS. 2A and 2C and an additional MPC fault module 714 that is the same or similar as the MPC fault module 261, and described more specifically below in FIG. 7B. MPC fault module 261 has+power/comm 1 line 243 and+power/comm 2 line 244. MPC fault module 714 has+power/comm 3 line 719 and+power/comm 4 line 720. The MPC fault modules are described in more detail in reference to FIG. 7B.

The constituent Nodes 702 through 713 each have three Node+power/comm lines for the three-wire structure with a Node fault/power module for each Node+power/comm line. For example, Node 702 has Node+power/comm 1 line 301C and Node+power/comm 2 line 302A (or the equivalent Node+power/comm 1 line 351 and Node+power/comm 2 line 352 from FIG. 3B), respectively, as described in reference to FIG. 3A (or in FIG. 3B). In this three-wire embodiment, Node 702 has an additional Node+power/comm 3 line 716. Each of the Node+power/comm lines can be coupled with a Node fault/power module described in more detail in reference to FIG. 7C. Each Node in this exemplary three-wire configuration can be similarly configured.

The system 700 shows several faults at different portions to demonstrate the enhanced survivability of the system with the faults. The faults include an electrical short 722 that goes to ground, illustrated as a circle with a ground, and an open circuit 723, illustrated as a circle with a broken conductor, such as from a broken+power/comm line between a Node and the MPC or between Nodes. For example, an electrical short 722 to ground is shown between+power/comm 1 line 243 of MPC fault modules 261 and Node+power/comm 1 line 301C of Node 702. Other exemplary shorts to ground are shown between Node 703 +power/comm 3 line 728 and Node 706+power/comm 3 line 729, Node 704+power/comm 2 line 730 and Node 710+power/comm 2 line 731, and Node 713+power/comm 1 line 732 and Node 712+power/comm 2 line 733. Open circuits are shown between Node 706+power/comm 2 line 734 and Node 707+power/comm 1 line 735 as well as between Node 708+power/comm 2 line 736 and Node 709+power/comm 1 line 737. In spite of the illustrated electrical faults, Nodes 702 through 713 can continue to function as designed. This capability demonstrates the extended survivability of the system 700 in adverse conditions.

Figure 7B:
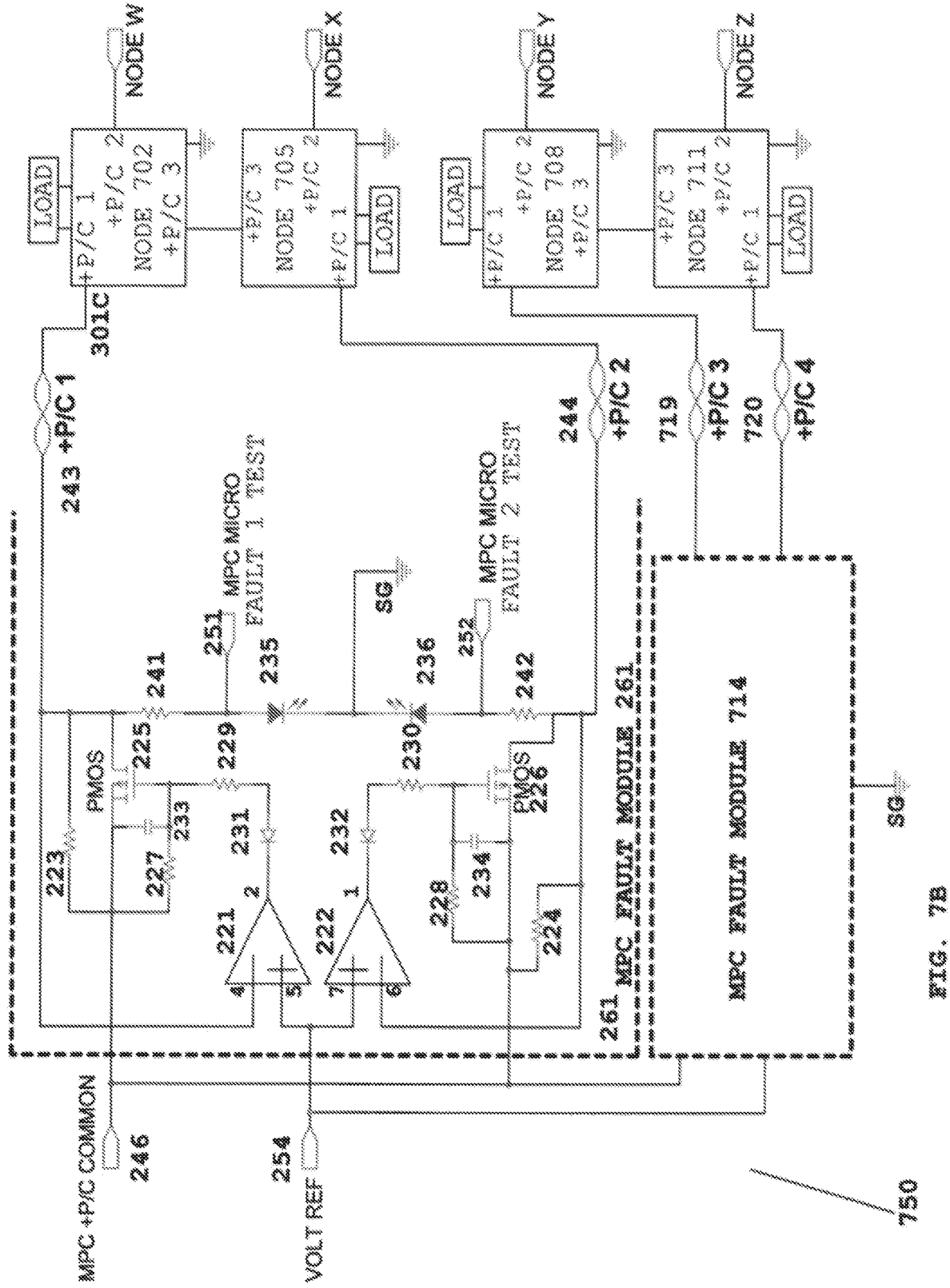
FIG. 7B is a schematic diagram of a portion of an MPC multi-module fault control circuit having multiple MPC fault modules and multiple Nodes for the exemplary modular three-wire loop configuration system of FIG. 7A.

FIG. 7B is a schematic diagram of a portion of an MPC multi-module fault control circuit 750 having multiple MPC fault modules and multiple Nodes for the exemplary modular three-wire loop configuration system of FIG. 7A. The circuit 750 is similar to the MPC fault control circuit 260 from FIG. 2C, but with an additional MPC fault module 714 that is the same or similar to the MPC fault module 261 for the additional+power/comm lines for the modular three-wire loop configuration system 700 from FIG. 7A. In this example, MPC fault module 261 has+power/comm 1 line 243 and+power/comm 2 line 244. MPC fault module 714 has +power/comm 3 line 719 and+power/comm 4 line 720.

Voltage reference 254 results from diode 248, capacitor 247, LED 220, and resistors 219 and 253 (from FIGS. 2A and 2C) and is also shown coupled to each MPC fault module 261 and 714 of MPC 701 (from FIG. 7A). Specifically, voltage reference 254 is coupled with the comparators of both MPC fault modules 261 and 714. Also, MPC+power/comm common line 246 (from FIGS. 2A, 2B, and 2C) is coupled with both MPC fault modules 261 and 714. A short occurring on any of+power/comm 1 line 243,+power/comm 2 line 244, +power/comm 3 line 719, or +power/comm 4 line 720 can be handled in a similar manner as described in FIG. 2C for the MPC fault control circuit 260.

In this example, there are four Nodes identified as Nodes 702, 705, 708 and 711. The +power/comm 1 line 243 from MPC fault module 261 is coupled to the Node +power/comm 1 line 301C of Node 702. The +power/comm 2 line 244, +power/comm 3 line 719, and +power/comm 4 line 720 are coupled to the Node +power/comm 1 lines of Nodes 705, 708 and 711, respectively. The +power/comm 2 line of each of these Nodes 702, 705, 708 and 711 is connected to the next Node in sequence, designated as Nodes W, X, Y, Z, where the lettered Nodes represent any Node in the sequence.

Figure 7C:
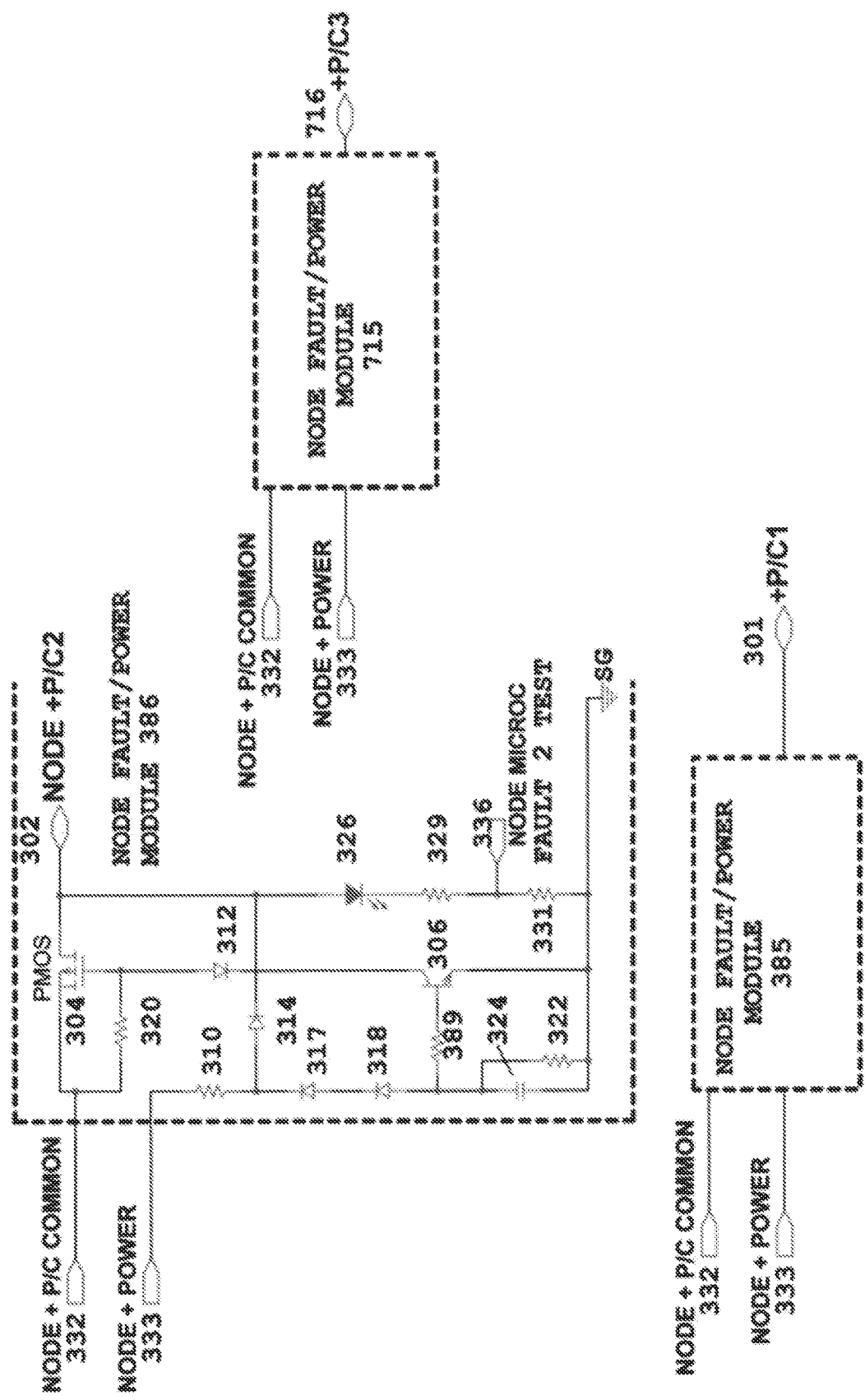
FIG. 7C is a schematic diagram of a portion of a Node fault and power handling circuit 760 in the exemplary modular three-wire loop configuration system of FIG. 7A.

FIG. 7C is a schematic diagram of a portion of a Node fault and power handling circuit 760 in the exemplary modular three-wire loop configuration system of FIG. 7A. FIG. 7C illustrates three Node fault/power modules for the three Node +power/comm lines on each Node illustrated in FIG. 7A. The Node fault/power modules can be the same or similar to the Node fault/power modules 385 and 386 from FIG. 3A or the equivalent Node fault/power modules 387 and 388 from FIG. 3B. For illustration, Node fault/power module 385 is shown in FIG. 7C as Node discrete fault/power module 386 from FIG. 3A. For example, Node fault/power module 385 can handle faults for Node 702 Node +power/comm 1 line 301 from FIG. 7A. Similarly Node fault/power module 386 can handle faults for Node 702 +power/comm 2 line 302, and Node fault/power module 715 can handle faults for Node 702 +power/comm 3 line 716. In the embodiment, each Node fault/power module of each Node is coupled with the Node +power/comm common line 332 from FIG. 3A of the Node discrete fault and power circuit 300, or the equivalent +power/comm common line 382 from FIG. 3B of the Node IC fault and power circuit 350. Likewise, in the embodiment, each Node fault/power module of each Node is also shown coupled with Node +power line 333 from FIG. 3A of the Node discrete fault and power circuit 300, or the equivalent Node +power line 383 from FIG. 3B of the Node IC fault and power circuit 350.

Figure 8A:
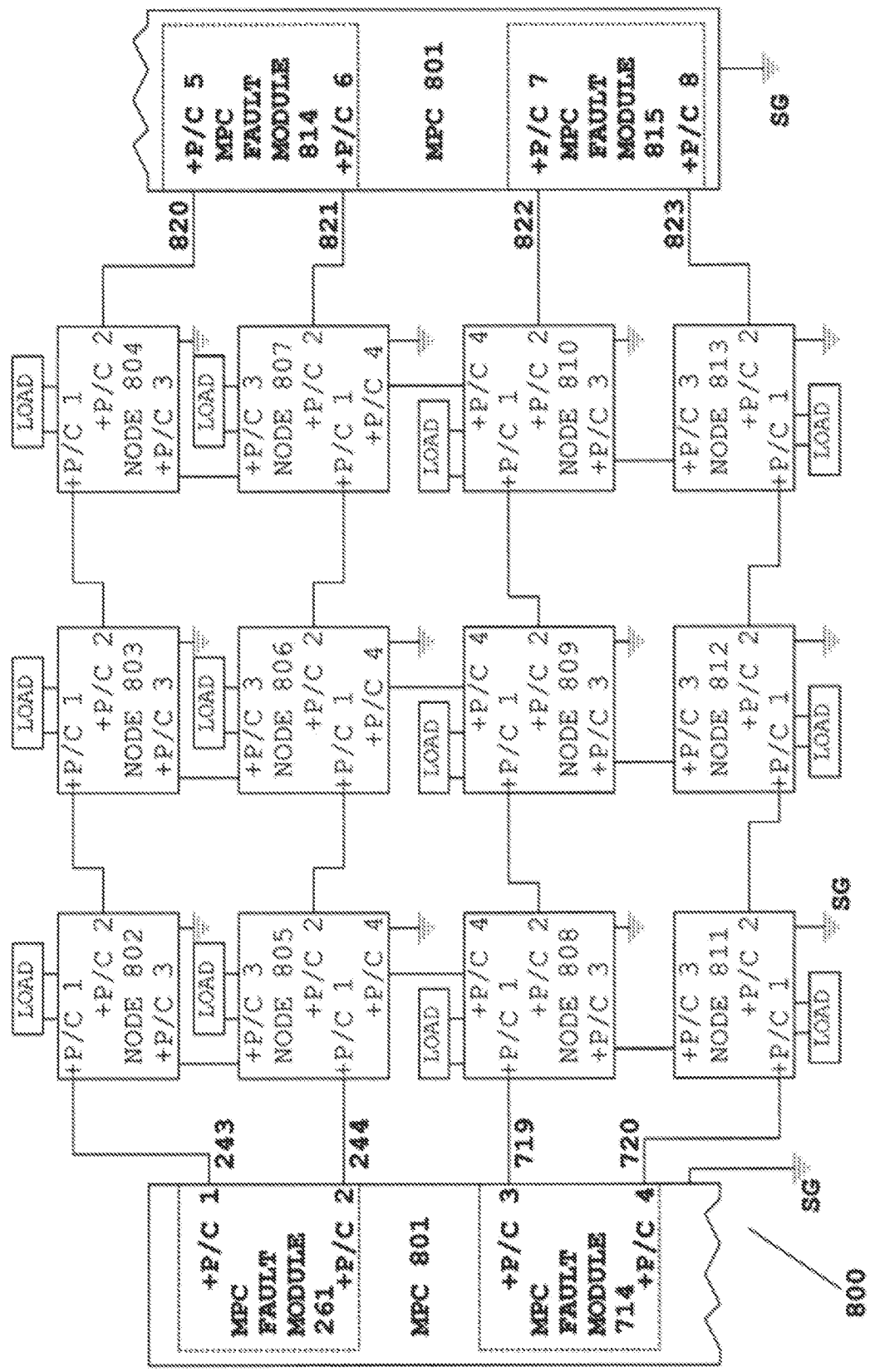
FIG. 8A is a graphic representation of an exemplary modular four-wire loop configuration system showing the MPC and multiple Nodes.

FIG. 8A is a graphic representation of an exemplary modular four-wire loop configuration system 800 showing the MPC and multiple Nodes. The exemplary configuration can be described as a full-fabric configuration with interior Nodes and perimeter Nodes. MPC 801 illustrates several MPC fault modules. For illustration, one half of MPC 801 is on the left side of the figure with two of the MPC fault modules, and the other half of the MPC 801 is on the right side of the figure with the other two MPC fault modules. The MPC fault modules include the MPC fault module 261 from FIGS. 2A, 2C, 7A, and 7B, and MPC fault module 714 from FIGS. 7A and 7B. Additional MPC fault modules 814 and 815 provide system capability for the additional power/comm lines in the four-wire system 800. Specifically, MPC fault module 261 is coupled to +power/comm 1 line 243 and +power/comm 2 line 244, as in FIGS. 2A and 2C and FIGS. 7A and 7B. MPC fault module 714 is coupled to +power/comm 3 line 719 and +power/comm 2 line 720, as in FIGS. 7A and 7B. Additional MPC fault module 814 is coupled to +power/comm 5 line 820 and +power/comm 6 line 821. Additional MPC fault module 816 is coupled to +power/comm 7 line 822 and +power/comm 8 line 823.

At least some of the perimeter Nodes can be coupled with three +power/comm lines. Specifically, the illustrated Nodes 802, 803, 804, 811, 812 and 813 with three +power/comm lines can be the same or similar to the three-wire Nodes from FIGS. 7A and 7B. At least some of interior Nodes can be coupled with four +power/comm lines. Specifically, Nodes 805 through 810 have four +power/comm lines each and may be coupled in an electronic fabric structure (four points of connection), depending on the application. As depicted, this fabric structure renders the entire system extremely resistant to electrical faults.

FIG. 8B is a schematic diagram of a portion of an MPC multi-module fault control circuit 850 having multiple MPC fault modules and multiple Nodes for the exemplary modular four-wire loop configuration system of FIG. 8A. MPC multi-module fault control circuit 850 illustrates two additional MPC fault modules for the additional +power/comm lines used in the exemplary four-wire system 800 from FIG. 8A compared to the three-wire loop configuration system from FIG. 7A, and three additional MPC fault modules compared to the two-wire system 200 from FIG. 2A. As stated above in reference to FIG. 8A, the additional MPC fault modules 814 and 815 can be the same or similar to the MPC fault module 261 from FIG. 2C and the corresponding MPC fault module 714 from FIG. 7A. MPC fault modules 261, 714, 814, and 815 are illustrated coupled to their respective +power/comm lines.

Voltage reference line 254 (from FIGS. 2A and 2C, and FIG. 7B) is also shown coupled to each MPC fault module. MPC +power/comm common line 246 (from FIGS. 2A and 2C, and FIG. 7B) is shown coupled to each MPC fault module.

Figure 8C:
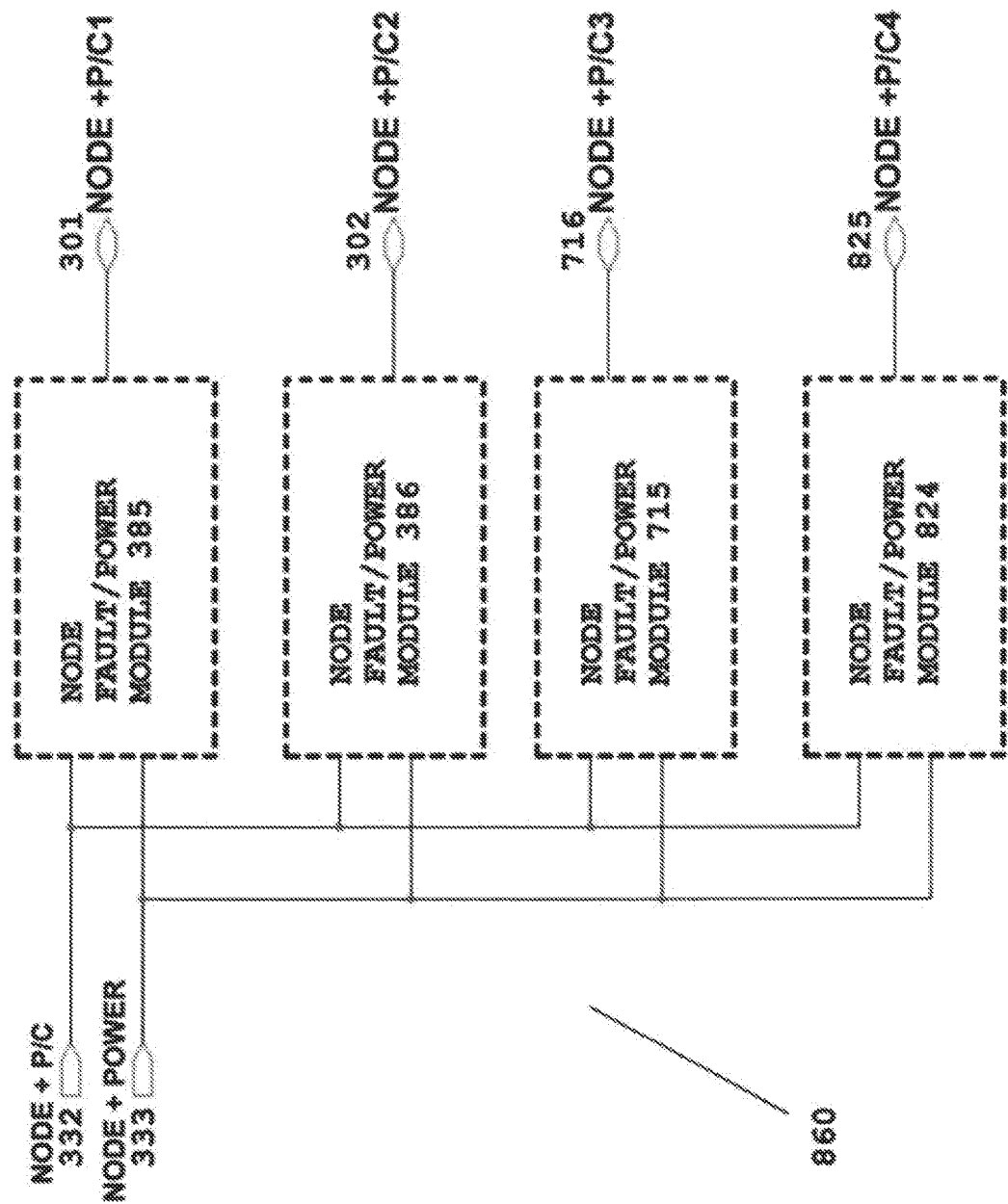
FIG. 8C is a schematic diagram of a portion of a Node fault and power handling circuit in the exemplary modular four-wire loop configuration system of FIG. 8A.

FIG. 8C is a graphic illustration for a Node fault and power handling circuit 860 for the exemplary modular four-wire loop configuration system of FIG. 8A. In comparison to the Node fault/power modules 385, 386, and 715 for the three Node +power/comm lines shown in FIG. 7C, the Node fault and power handling circuit 860 has an additional Node fault/power module 824 for an additional Node +power/comm 4 line 825, which allows for either three Node +power/comm lines per Node or four Node +power/comm lines per Node, as applicable for the full fabric structure, depending on application and requirements.

In the embodiment, each Node fault/power module of each Node is coupled with Node +power/comm common line 332 from FIG. 3A of the Node discrete fault and power circuit 300, or the equivalent +power/comm common line 382 from FIG. 3B of the Node IC fault and power circuit 350. Likewise, each Node fault/power module of each Node is also shown coupled with Node +power line 333 from FIG. 3A of the Node discrete fault and power circuit 300, or the equivalent Node +power line 383 from FIG. 3B of the Node IC fault and power circuit 350.

The invention has been described in the context of preferred and other embodiments and not every embodiment of the invention has been described. Obvious modifications include variations in the number of components and their rated electrical values, the timing of different portions of the circuit for operation in comparison with other portions to spike and surge control, arrangement of the Nodes in a variety of configurations, and other variations and associated methods of use and manufacture that an ordinary person skilled in the art would envision given the teachings herein. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope of the following claims.

The invention claimed is:

1. A power and bidirectional data transmission system (100) with electrical fault isolation, comprising:
 a DC power source (110);

a main power controller (105) ("MPC") coupled to the DC power source, comprising:
an MPC power and communication circuit (121) configured to control power from the DC power source in coordination with data communications and comprising an MPC data receiver circuit (270, 280);
a plurality of power and communication lines comprising at least a first power and communication line (243) for a first power and a second power and communication line (244) for a second power and each configured to conduct the power and conduct bidirectional data transfer with the MPC data receiver circuit; and
an MPC fault control circuit (260) coupled to each of the first and second power and communication lines and configured to automatically and temporarily turn off power to a portion of the system coupled to the first power and communication line (243) upon the occurrence of an electrical fault in the system and automatically maintain at least partial operation of the system through the second power and communication line (244); and
at least one node (140) comprising a microcontroller (141) and coupled to each of the at least first and second power and communication lines in a loop configuration comprising the first power and communication line (243) coupled between the MPC fault control circuit (260) and the node (140), and the second power and communication line (244) coupled between the node (140) and the MPC fault control circuit (260).

2. The system of claim 1, further comprising a plurality of nodes (140) coupled in the loop configuration with the main power controller (105), wherein at least some of the nodes are coupled in series, in parallel, or a combination thereof.

3. The system of claim 1, wherein the MPC power and communication circuit (121) is configured to allow communications in the system between the main power controller (105) and the at least one node (140), between at least two nodes, or combination thereof by a temporary drop in voltage in at least one of the power and communication lines (243, 244) from a first level of power (501) for main power and voltage to the system to a lower second level of power (502) for communications in the system.

4. The system of claim 3, wherein the drop in voltage in at least one of the power and communication lines (243, 244) from the first level of power to the lower second level of power occurs without a polarity change in voltage.

5. The system of claim 4, wherein the drop in voltage in at least one of the power and communication lines (243, 244) from the first level of power to the lower second level of power when power to at least a portion of the system is temporarily grounded.

6. The system of claim 4, wherein the drop in voltage in at least one of the power and communication lines (243, 244) from the first level of power to the lower second level of power occurs by a temporarily grounded power line with a transitory power provided by resistance, capacitive buffer, battery power, other power source, or a combination thereof for a sufficient duration for data communication before the grounded power line is released from ground and power in the system can return back to the first level of power.

7. The system of claim 1, further comprising an electrical fault test line (251, 335) in the circuit on at least one of the power and communication lines.

8. The system of claim 1, wherein the at least one node (140) is configured to communicate automatically to the main power controller (105) of an electrical fault condition sensed by the node in at least one of the power and communication lines coupled to the node.

9. The system of claim 1, wherein the MPC fault control circuit (260) comprises components independent of a microcontroller.

10. The system of claim 9, wherein the MPC fault control circuit comprises a MOSFET (225), resistor (227), capacitor (233), comparator (221), or a combination thereof.

11. The system of claim 10, wherein the comparator (221) is configured to sense voltage levels.

12. The system of claim 1, wherein the MPC fault control circuit (260) is configured to automatically turn on power to the portion of the system when the electrical fault is cleared.

13. The system of claim 1, wherein the MPC fault control circuit (260) is configured to automatically protect the power and communication circuit from short circuits.

14. The system of claim 1, wherein the MPC fault control circuit (260) is configured to automatically protect the at least one node (140) from a short circuit in at least one of the power and communication lines (301, 302) so that current does not flow from the node into the short circuit.

15. The system of claim 14, wherein the MPC fault control circuit (260) is configured to automatically allow power to flow into the at least one node (140) through the power and communication line with the short circuit when the short circuit is removed in such power and communication line.

16. The system of claim 1, wherein the main power controller (105) comprises a microcontroller (125), and wherein the MPC fault control circuit (260) is configured to operate independently of the microcontroller such that the MPC power and communication circuit (121) does not operate the first and second power and communication lines (243, 244) simultaneously in the event of an electrical fault.

17. The system of claim 1, wherein the MPC fault control circuit (260) is configured to create a relative difference between a turn-on time of a first transistor and a turn-off time of a second transistor equal to at least one order of magnitude.

18. The system of claim 1, wherein the at least one node (140) is coupled to a load (145), wherein the load comprises a sensor, an actuator, or a combination thereof.

19. The system of claim 1, wherein the at least one node (140, 702) is coupled to at least three power and communication lines (301, 302, 716) and the MPC fault control circuit (260) is coupled to each of the power and communication lines.

20. The system of claim 19, further comprising a plurality of nodes, wherein each node is coupled to the at least three power and communication lines and coupled to each other.

21. The system of claim 19, further comprising a plurality of nodes (140, 702, 802), wherein at least some of the nodes are coupled to the at least three power and communication lines (301, 302, 716), and other of the nodes are coupled to at least four power and communication lines (301, 302, 716, 825).

22. The system of claim 1, wherein the at least one node (140, 802) is coupled to at least four power and communication lines (301, 302, 716, 825) and an MPC fault control circuit (260) is coupled to each of the power and communication lines.

23. The system of claim 1, further comprising a node fault and power circuit (300, 350) coupled to the at least one node (140) and configured to automatically and temporarily turn off power from a power and communication line (301) coupled to the node and the node fault and power circuit upon the occurrence of an electrical fault to the node from such power and communication line.

24. The system of claim 23, wherein the node fault and power circuit (300, 350) automatically communicates the electrical fault to the main power controller (105), other nodes (160) coupled to the system, or a combination thereof.

25. The system of claim 23, wherein the node fault and power circuit (300, 350) is configured to automatically turn on power through the power and communication line with the electrical fault when the electrical fault is removed.

26. A main power controller ("MPC") (105) configured to be coupled between a DC power source (110) and at least one load (145), comprising:
an MPC power and communication circuit (250) configured to control power from the DC power source in coordination with data communications;
a plurality of power and communication lines comprising at least a first power and communication line (243) having a first power, and a second power and communication line (244) having a second power, and each configured to conduct the DC power and conduct bidirectional data transfer; and
an MPC fault control circuit (260) coupled to each of the first and second power and communication lines and configured to automatically and temporarily turn off power to circuitry coupled to the first power and communication line (243) upon the occurrence of an electrical fault in the system and automatically maintain at least partial operation of the system through the second power and communication line (244).

27. A node (140), comprising:
a node microcontroller (141); and
a node fault and power circuit (300, 350) configured to be coupled between a load (145) and a main power controller (105) that is coupled to a DC power source (110) through at least a first power and communication line (301) for a first power, and a second power and communication line (302) for a second power, and each power and communication line configured to conduct the power into the node and conduct bidirectional data transfer between the node microcontroller (141) and the main power controller (105) in a loop configuration comprising the first power and communication line (301) coupled between the main power controller (105) and the node (140), and the second power and communication line (302) coupled between the node (140) and the main power controller (105), the node fault and power circuit (300, 350) configured to automatically and temporarily turn off power to circuitry coupled to the first power and communication line (301) upon the occurrence of an electrical fault between the node (140) and the main power controller (105) and automatically maintain operation of the node (140) through the second power/communications line (301).

28. A method of protecting a system (100) having a DC power source (110), a main power controller (105), and at least one node (140), comprising:
providing DC power from the DC power source (110) to the main power controller (105);
providing a first power to a first power and communication line (243) and a second power to a second power and communication line (244) from the main power controller (105) to the at least one node (140) in a loop configuration wherein the first and second power and communication lines are both coupled to the main power controller and the at least one node;
automatically and temporarily turning off power to a portion of the system coupled to the first power and communication line (243) upon the occurrence of an electrical fault in the system and automatically maintaining at least partial operation of the system through the second power and communication line (244); and
automatically sending data about the electrical fault to the main power controller (105) through the first power and communication line, the second power and communication line, or a combination thereof.

29. The method of claim 28, comprising automatically turning on power to the portion of the system through the first power and communication line (243) after correcting the electrical fault.

* * * * *